(12) United States Patent
Youssef et al.

(10) Patent No.: US 11,255,980 B2
(45) Date of Patent: Feb. 22, 2022

(54) COLLABORATIVE POSITIONING

(71) Applicant: SONY CORPORATION, Tokyo (JP)

(72) Inventors: Mohamed Youssef, San Diego, CA (US); Katsuyuki Tanaka, Tokyo (JP)

(73) Assignee: SONY CORPORATION, Tokyo (JP)

( * ) Notice: Subject to any disclaimer, the term of this patent is extended or adjusted under 35 U.S.C. 154(b) by 386 days.

(21) Appl. No.: 16/456,107

(22) Filed: Jun. 28, 2019

(65) Prior Publication Data
US 2020/0408927 A1 Dec. 31, 2020

(51) Int. Cl.
*G01S 19/48* (2010.01)
*H04B 17/318* (2015.01)
*G01S 5/14* (2006.01)
*H04W 4/02* (2018.01)
*H04W 64/00* (2009.01)

(52) U.S. Cl.
CPC ............. *G01S 19/48* (2013.01); *G01S 5/14* (2013.01); *H04B 17/318* (2015.01); *H04W 4/025* (2013.01); *H04W 64/003* (2013.01)

(58) Field of Classification Search
CPC .......... G01S 19/48; G01S 5/14; H04B 17/38; H04W 64/003
USPC .................................................... 342/357.43
See application file for complete search history.

(56) References Cited

U.S. PATENT DOCUMENTS

| 7,904,244 | B2 | 3/2011 | Sugla | |
|---|---|---|---|---|
| 2002/0055362 | A1 | 5/2002 | Aoyama | |
| 2004/0033808 | A1* | 2/2004 | Rorabaugh | H04W 64/00 455/456.1 |

(Continued)

FOREIGN PATENT DOCUMENTS

| BR | PI0618280 A2 | 8/2011 |
|---|---|---|
| CA | 2627515 A1 | 5/2007 |

(Continued)

OTHER PUBLICATIONS

Huang, et al., "GNSS Collaborative Positioning and Performance Analysis", Proceedings of the 27th International Technical Meeting of the Satellite Division of The Institute of Navigation (ION GNSS+ 2014), Tampa, Florida, Sep. 2014, pp. 1920-1930.

(Continued)

*Primary Examiner* — Harry K Liu
(74) *Attorney, Agent, or Firm* — Chip Law Group

(57) ABSTRACT

A system and method are provided for collaborative positioning of wireless nodes using pairwise range measurements and positioning technology type. The system includes a plurality of wireless nodes communicatively coupled to each other via a wireless network. The plurality of wireless nodes include a first wireless node that estimates a plurality of pairwise range estimates between the first wireless node and each neighboring wireless node of a set of neighboring wireless nodes. The first wireless node receives the current position estimate and the positioning technology type of each neighboring wireless node and assigns a weight value to each neighboring wireless node based on the positioning technology type. The first wireless node computes an initial position estimate for the first wireless node based on the assigned weight value, the current position estimate, and a pairwise range estimate and determines a final position estimate for the first wireless node.

23 Claims, 6 Drawing Sheets

(56) References Cited

U.S. PATENT DOCUMENTS

| | | | | |
|---|---|---|---|---|
| 2007/0082677 | A1* | 4/2007 | Donald Hart | H04W 16/18 455/456.1 |
| 2013/0301601 | A1* | 11/2013 | Takano | H04W 72/042 370/329 |
| 2015/0156746 | A1* | 6/2015 | Horne | G01S 5/0226 455/456.6 |
| 2016/0255604 | A1* | 9/2016 | Venkatraman | H04W 64/00 455/456.1 |
| 2017/0356979 | A1* | 12/2017 | Georgiou | G01S 5/0215 |
| 2019/0069263 | A1* | 2/2019 | Ylamurto | H04W 64/003 |

FOREIGN PATENT DOCUMENTS

| | | |
|---|---|---|
| CA | 2744847 A1 | 5/2007 |
| CA | 2744873 A1 | 5/2007 |
| CA | 2744874 A1 | 5/2007 |
| CN | 106054129 A | 10/2016 |
| EP | 1206152 A2 | 5/2002 |
| EP | 1960805 A2 | 8/2008 |
| EP | 2333575 A2 | 6/2011 |
| EP | 2891896 A1 | 7/2015 |
| JP | 3479885 B2 | 12/2003 |
| JP | 5474923 B2 | 4/2014 |
| JP | 2014-090451 A | 5/2014 |
| JP | 5726402 B2 | 6/2015 |
| JP | 6100306 B2 | 3/2017 |
| KR | 10-2008-0074971 A | 8/2008 |
| KR | 10-2010-0084691 A | 7/2010 |
| KR | 10-1051752 B1 | 7/2011 |
| WO | 2007/056738 A2 | 5/2007 |

OTHER PUBLICATIONS

Huang, et al., "Distributed GNSS Collaborative Positioning Algorithms and Performance Analysis", Lecture Notes in Electrical Engineering, vol. 342, Chapt 37, pp. 427-437, Apr. 2015.

International Search Report and Written Opinion of PCT Application No. PCT/IB2020/055460, dated Aug. 31, 2020, 16 pages of ISRWO.

* cited by examiner

COLLABORATIVE POSITIONING

CROSS-REFERENCE TO RELATED APPLICATIONS/INCORPORATION BY REFERENCE

None.

FIELD

Various embodiments of the disclosure relate to wireless positioning technologies. More specifically, various embodiments of the disclosure relate to a system and method for collaborative positioning of wireless nodes including pairwise range measurements and positioning technology type.

BACKGROUND

Advancements in wireless positioning technologies have paved the way for collaborative positioning of wireless devices in different geographical locations. In a typical collaborative positioning setup, various wireless devices may have a location sensor, such as a Global Navigation Satellite System (GNSS) sensor, which may output raw positioning information. In such a setup, each wireless device may receive positioning information from some or all of the wireless devices in a wireless network. Each wireless device may update its geo-location based on the raw positioning information and the positioning information received from some or all of the wireless devices in the wireless network. The accuracy of the geo-location estimate for each wireless device drops when a positioning method or the location sensor employed by some or all of the wireless devices is inaccurate or less accurate than a desired accuracy. This may further propagate and amplify inaccurate measurements of geo-location across different wireless devices in the wireless network, which may lead to further inaccuracy in the estimation of geo-location.

Further limitations and disadvantages of conventional and traditional approaches will become apparent to one skilled in the art, through comparison of described systems with some aspects of the present disclosure, as set forth in the remainder of the present application and with reference to the drawings.

SUMMARY

A system and method are provided for collaborative positioning of wireless nodes using pairwise range measurements and positioning technology type, as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Certain embodiments of the disclosure may be found in a system and a method for collaborative positioning of wireless nodes (e.g., radio devices) using pairwise range measurements and positioning technology typically used in individual wireless nodes and various wireless standards. Multiple embodiments of the disclosure may provide a system that may include a plurality of wireless nodes communicatively coupled to each other in a wireless network. In some scenarios, the plurality of wireless nodes may be communicatively coupled to a server. Each wireless node of the plurality of wireless nodes may be configured to share a current position estimate and a positioning technology type with a set of neighboring wireless nodes of the plurality of wireless nodes. The present disclosure provides a collaborative positioning approach to update initial position estimates of each wireless node, such as a mobile phone or an in-vehicle positioning device, in a wireless network. In the disclosed collaborative positioning approach, each wireless node may share knowledge of its position estimate along with information associated with a positioning technology type employed by the corresponding wireless node with other wireless nodes on the wireless network. For example, the positioning technology type may include details of a type of location sensor, a type of signal used by the location sensor, or a positioning method employed by the location sensor. Different positioning technology type may correspond to a different level of accuracy in terms of a deviation of a position estimate from a ground truth value. This may help the system to weigh position estimates of individual wireless nodes and define an accuracy level for individual position estimates while computing final position estimates (i.e. initial position estimate and a coordinate correction estimate) for individual wireless nodes.

Figure 1:
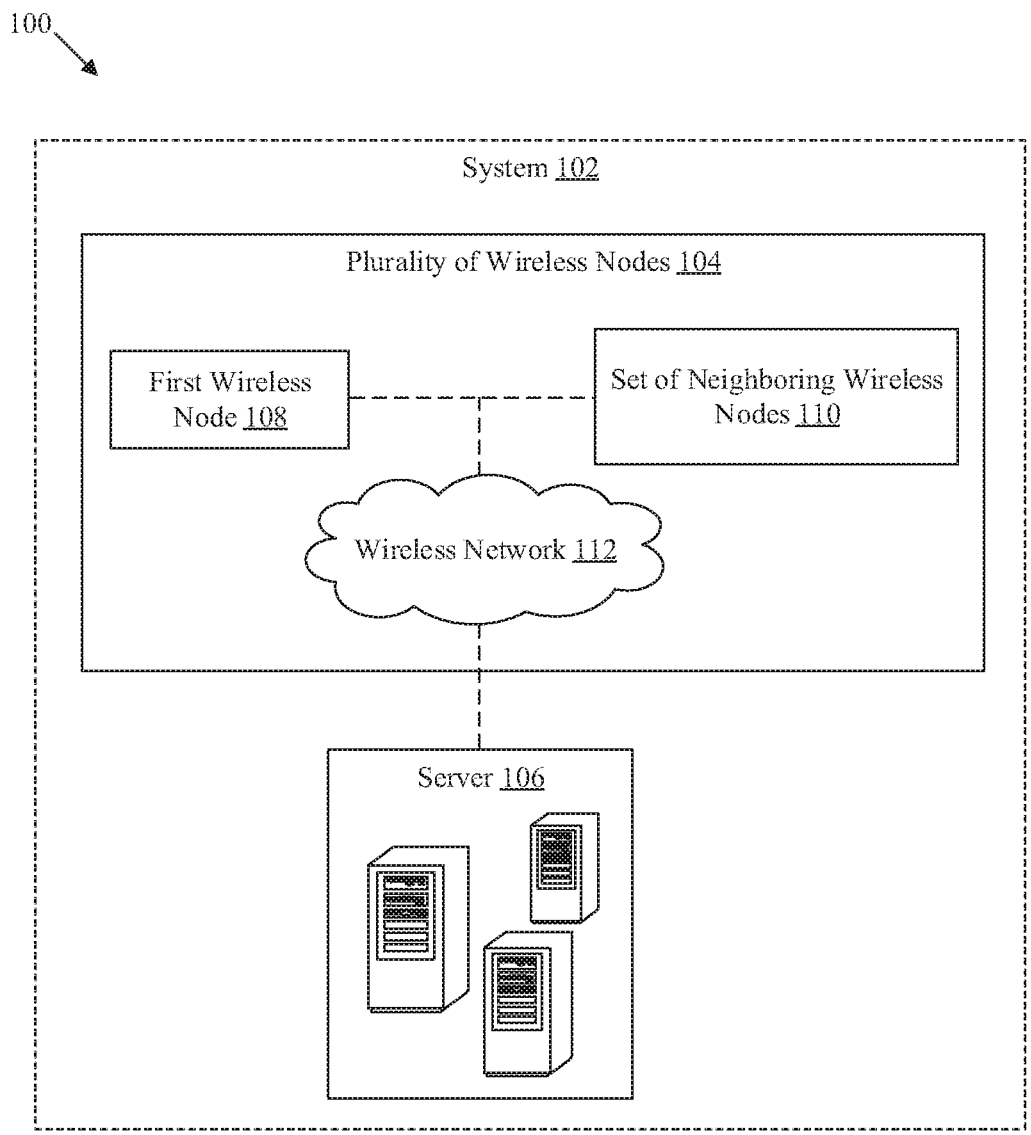
FIG. 1 illustrates a network environment for collaborative positioning of wireless nodes using pairwise range measurements and positioning technology type, in accordance with an embodiment of the disclosure.

FIG. 1 illustrates a network environment for collaborative positioning of wireless nodes using pairwise range measurements and positioning technology type, in accordance with an embodiment of the disclosure. With reference to FIG. 1, there is shown a network environment 100. The network environment 100 includes a system 102. The system 102 may include a plurality of wireless nodes 104 and a server 106. The plurality of wireless nodes 104 may include a first wireless node 108 and a set of neighboring wireless nodes 110. Each of the plurality of wireless nodes 104 may be communicatively coupled to each other and/or the server 106, via a wireless network 112. In FIG. 1, the server 106 is shown communicatively coupled to the plurality of wireless nodes 104 directly via the wireless network 112. However, in some embodiments, the server 106 may be communicatively coupled to the plurality of wireless nodes 104, via one or more wireless access points (WAPs) or a multi-hop network that may include one or more wired or wireless networks and network gateways.

In accordance with an embodiment, the system 102 may be a centralized positioning system that may include a dedicated server, such as the server 106, for communication with the plurality of wireless nodes 104. In such a configuration, each wireless node of the plurality of wireless nodes 104 may be configured to share information, such as a current position estimate and a positioning technology type, with the server 106 and/or the set of neighboring wireless nodes 110 of the plurality of wireless nodes 104. As an example, the initial position estimate may correspond to the initial coordinate approximations obtained based on the positioning technology type employed by the corresponding wireless node. The dedicated server may receive the information from different wireless nodes and compute a final position estimate (a corrected coordinate value) for each wireless node of the plurality of wireless nodes 104, via the wireless network 112. The final position estimate may include a coordinate correction to an initial position estimate to obtain an accurate and reliable current position fix for each wireless node of the plurality of wireless nodes 104.

In accordance with another embodiment, the system 102 may be a distributed system that may include the plurality of wireless nodes 104. In such a configuration, each wireless node of the plurality of wireless nodes 104 may be configured to share information, such as a current position estimate and a positioning technology type, with the set of neighboring wireless nodes 110 of the plurality of wireless nodes 104. Each wireless node may receive such information from different neighboring wireless nodes and compute the final position estimate for itself. The final position estimate may be further shared with remaining wireless nodes in the set of neighboring wireless nodes 110, via the wireless network 112.

The plurality of wireless nodes 104 may be a group of electronic devices distributed at different geo-locations at a particular time. In certain embodiments, the plurality of wireless nodes 104 may include a set of unknown location nodes and a set of known location nodes. An unknown location node may be a node that may have an unknown position estimate or may lack a location sensor capable of locating itself within a geographical region. Similarly, a known location node may be a node (such as an anchor node) that may use a precise positioning method to locate itself in the geographical region. An example of a known location node may be a survey-grade base station that may have a fixed, known location within the geographical region.

Each wireless node of the plurality of wireless nodes 104 may comprise suitable logic, circuitry, and interfaces that may be configured to communicate with other neighboring wireless nodes of the plurality of wireless nodes 104, via the wireless network 112. More specifically, each wireless node of the plurality of wireless nodes 104 may be further configured to share a current position estimate and a positioning technology type with the set of neighboring wireless nodes 110 of the plurality of wireless nodes 104. For example, a wireless node may retrieve current positioning information (e.g., uncertainty information from a Global Navigation Satellite System (GNSS) receiver) and compute a current position estimate based on the retrieved current positioning information and current position estimates shared by different neighboring wireless nodes.

Each wireless node may include a memory, a processor, a radio frequency (RF) circuitry, and a location sensor, such as a GNSS receiver. The RF circuitry may be different for different wireless nodes. A type of RF circuitry may determine a type of wireless communication that may be established between a pair of wireless nodes of the plurality of wireless nodes 104 in the geographical region. The type of RF circuitry may also affect different factors, such as a range (i.e. a distance) of the wireless communication for an individual node, a type of wireless protocol, a maximum and a minimum data rate, a signal strength (or a signal energy), a frequency band in use, a noise level, and a time delay in arrival of RF signals that carry data associated with individual wireless nodes. For example, a Bluetooth Low Energy (BLE) RF circuitry in a wireless node may offer low energy and short-range wireless communication as compared to a long-range Wi-Fi circuitry.

In some embodiments, each of the plurality of wireless nodes 104 may include a location sensor that may output the current positioning information of a corresponding wireless node of the plurality of wireless nodes 104. In other embodiments, only a portion of the plurality of wireless nodes 104 may have the location sensor and the remaining wireless nodes of the wireless nodes may rely on information, such as current position estimates, from neighboring wireless nodes to identify a final position estimate in the geographical region.

The server 106 may comprise suitable logic, circuitry, and interfaces that may be configured to centrally manage a collaborative position update of each wireless node of the plurality of wireless nodes 104. The server 106 may be configured to receive a current position estimate and/or raw positioning information (from individual location sensors) of each wireless node of the plurality of wireless node 104. The server 106 may be configured to determine a final position fix (or a final position estimate) for each wireless node based on the current position estimate (and/or the raw current positioning information) from different pairs of wireless nodes of the plurality of wireless nodes 104.

In some embodiments, the server 106 may be communicatively coupled to each of the plurality of wireless nodes 104, via a sink node or through different intermediary nodes and wireless access points (WAPs). The server 106 may be a cloud server, a dedicated server for the wireless network 112 of the geographical region, or a server cluster that may be part of a distributed system of network devices. Examples of the server 106 may include, but are not limited to, cloud servers, media servers (i.e. as part of a content delivery network), ad hoc servers on local communication devices (e.g., smartphones), and a virtual server on a remote or a local device connected through the wireless network 112 to different wireless access points.

The first wireless node 108 may be an electronic device (e.g., a radio device) that may be required to precisely determine a final position estimate for itself in the geographical region. In some embodiments, the first wireless node 108 may be one of the sets of unknown location nodes in the wireless network 112. In such cases, the first wireless node 108 may be unaware of its correct position in the geographical region. In some embodiments, the first wireless node 108 may lack a location sensor and may rely on information shared by the set of neighboring wireless nodes 110 connected to the wireless network 112. Examples of the first wireless node 108 may include, but are not limited to, a smartphone, a smartwatch, a camera, an in-vehicle positioning system for a vehicle, a vehicle, a tracking chip for a delivery package, a base station, a server, a repeater, a wireless router, a personal computer, a laptop, and different general purpose or application-specific sensors for internet of things (IOT) applications.

The wireless network 112 may include a medium through which two or more wireless nodes of the plurality of wireless nodes 104 may communicate with each other. Also, the wireless network 112 may include a medium through which the server 106 and/or other network-related devices in the wireless network 112 may provide communication with each other and the wireless node 108. The wireless network 112 may be established in accordance with Institute of Electricals and Electronics Engineers (IEEE) standards for infrastructure mode (Basic Service Set (BSS) configurations), or in some specific cases, in ad hoc mode (Independent Basic Service Set (IBSS) configurations). The wireless network 112 may be established between different pairs of wireless nodes of the plurality of wireless nodes 104.

The wireless network 112 may be a Wireless Sensor Network (WSN), a Mobile Wireless Sensor Network (MWSN), a wireless ad hoc network, a Mobile Ad-hoc Network (MANET), a Wireless Mesh Network (WMN), a Wide Area Network (WAN), a Wireless Local Area Network (WLAN), a cellular network, a Long Term Evolution (LTE) network, or an Evolved High Speed Packet Access (HSPA+), and the like. The wireless network 112 may operate in accordance with IEEE standards, such as 802 wireless standards or a modified protocol, which may include, but are not limited to, 802.3, 802.15.1, 802.16 (Wireless local loop), 802.20 (Mobile Broadband Wireless Access (MBWA)), 802.11-1997 (legacy version), 802.15.4, 802.11a, 802.11b, 802.11g, 802.11e, 802.11i, 802.11f, 802.11c, 802.11h (specific to European regulations) 802.11n, 802.11j (specific to Japanese regulations), 802.11p, 802.11ac, 802.11ad, 802.11ah, 802.11aj, 802.11ax, 802.11 ay, 802.11az, 802.11 hr (high data rate), 802.11af (white space spectrum), 802.11-2007, 802.11-2008, 802.11-2012, 802.11-2016.

For different pairs of wireless nodes, the wireless network 112 may be established to use different types of communication, such as a short-range communication or a long range communication. The short range communication may be a point-to-point communication, a point-to-point line-of-sight (LOS) communication, or a point-to-multipoint communication. Examples of protocols for the short-range communication may include, but are not limited to, Radio Frequency Identification (RFID), Wireless USB, Dedicated Short Range Communications (DSRC), and Near Field Communication (NFC) (e.g., NFC Peer-to-Peer), Bluetooth, or Bluetooth Low Energy (BLE). Other examples of protocols for the different types of communication may include, but are not limited to, ZigBee, Personal Area Network (PAN), Wi-Max, Wireless Metropolitan Area Networks (WMAN), and Local Multipoint Distribution Service.

In operation, each wireless node of the plurality of wireless nodes 104 may be configured to communicate with each other and/or the server 106, via the wireless network 112. In some embodiments, each of the plurality of wireless nodes 104 may include a location sensor that may output current positioning information of a corresponding wireless node of the plurality of wireless nodes 104. The current positioning information may be raw position information, such as pseudorange data from GNSS receivers. Each of the plurality of wireless nodes 104 may be configured to compute a current position estimate for itself based on the current positioning information. The current position estimate may correspond to an approximate or a less accurate position of the corresponding wireless node in the geographical region. For example, a wireless node (X) may compute its current position estimate to be accurate up to "100 meters". However, a coordinate correction (i.e. a correction estimate) may be required to update the current position estimate of the wireless node (X) and achieve a precise position fix for the wireless node (X). Alternatively, each wireless node of the plurality of wireless nodes 104 may be configured to share the current position estimate and a positioning technology type with the set of neighboring wireless nodes 110 of the plurality of wireless nodes 104.

The plurality of wireless nodes 104 may include the first wireless node 108 that may have an imprecise position estimate or an unknown position at a particular time in the geographical region. The inaccurate position estimate or the unknown position of the first wireless node 108 may be a result of the positioning technology type employed by the first wireless node 108. For example, the positioning technology type may correspond to a single frequency (L1) GNSS signals to estimate the current position estimate. Also, in some cases, the imprecise position estimate or the unknown position of the first wireless node 108 may be a result of different factors, such as a poor signal fidelity or a low signal to noise ratio (SNR, in dB) of raw signals captured by the location sensor, a geographical barrier (such as a tunnel, a mountain, or sky rise buildings), and/or use of a low precision location sensor.

In accordance with an embodiment, the first wireless node 108 may be communicatively coupled to the set of neighboring wireless nodes 110 in the geographical region. Each neighboring node of the set of neighboring wireless nodes 110 may be configured to share information, such as the current-position estimate and the positioning technology type, via an RF signal, with each other and the first wireless node 108. The first wireless node 108 may be configured to receive the RF signal from each neighboring node of the set of neighboring wireless nodes 110, via the wireless network 112. Further, the first wireless node 108 may be configured to estimate a plurality of pairwise range estimates between the first wireless node 108 and each neighboring wireless node of the set of neighboring wireless nodes 110. Each pairwise range estimate of the plurality of pairwise range estimates may correspond to a distance (i.e., an internode distance) between the first wireless node 108 and a corresponding neighboring wireless node of the set of neighboring wireless nodes 110. The estimation of the plurality of pairwise range estimates may rely on a ranging technique that may be known to one ordinarily skilled in the art. Examples of the ranging technique may include, but are not limited to, a Received Signal Strength (RSS)-based ranging technique, Time of Arrival (TOA)-based ranging technique, or a Round Trip Delay (RTD)-based ranging technique.

As an example, using the RSS-based ranging technique, the first wireless node 108 may be configured to measure the power of an RF signal transmitted by a neighboring wireless node. Using a defined path loss model, a pairwise range estimate (i.e., an internode distance) may be estimated based on knowledge of transmitted power of the RF signal and different environmental parameters. As another example, using the TOA-based ranging technique, the first wireless node 108 may measure a time (t) needed for an RF signal to travel to or from a neighboring wireless node. The pairwise range estimate (i.e., the intra-node distance) may be then estimated based on the speed of light (c) and the measured time (t).

In accordance with an embodiment, the first wireless node 108 may be configured to iteratively compute a ranging error between the first wireless node 108 and a corresponding neighboring wireless node of the set of neighboring wireless nodes 110. The ranging error may correspond to a deviation of a pairwise range estimate (measured using the ranging technique) and a Euclidean distance between the first wireless node 108 and the neighboring wireless node of the set of neighboring wireless nodes 110. The first wireless node 108 may be configured to minimize a total ranging error (e.g., the total ranging error may be modeled as a sum of squared ranging error) between the first wireless node 108 and each neighboring wireless node of the set of neighboring wireless nodes 110. A value of the total ranging error may be indicative of sensitivity of the ranging technique to different parameters, such as the positioning technology type employed by each neighboring wireless node of the set of neighboring wireless nodes 110. The effect of the sensitivity of the ranging technique may be reflected in the plurality of pairwise range estimates and the total ranging error for the set of neighboring wireless nodes 110.

The first wireless node 108 may be further configured to receive a current position estimate and a positioning technology type of each neighboring wireless node of the set of neighboring wireless nodes 110, via the wireless network 112. The positioning technology type may correspond to at least a location sensor type, a type of positioning technique employed to estimate the current position estimate or a type of signal associated with the location sensor. For example, the position technology type may correspond to a GNSS receiver type that uses a Precise Point Positioning (PPP) technique or a GNSS positioning method based on dual frequency GNSS signals, such as "L1" and "L5" signals. Other examples of the positioning technology type may include, but are not limited to, Real Time Kinematic (RTK) technique for the GNSS receiver, a Differential Global Positioning System (DGPS), and a Survey-Grade GNSS receiver.

The first wireless node 108 may be further configured to assign a weight value to each neighboring wireless node of the set of neighboring wireless nodes 110 based on the positioning technology type of an adjacent wireless node of the set of neighboring wireless nodes 110. For example, an accuracy of a current position estimate for an adjacent wireless node (A) that may only rely on "L1" GNSS signals may be less than that for an adjacent wireless node (B) that may use dual frequency GNSS signals, such as "L1" and "L5" GNSS signals. Similarly, an accuracy of a current position estimate for the adjacent wireless node (B) may be less than that of a adjacent wireless node (C) that may use a survey-grade GNSS receiver and an inertial measurement unit (IMU). Thus, based on the assignment of a weight value to each neighboring wireless node of the set of neighboring wireless nodes 110, a preference may be assigned to different current position estimates based on a respective accuracy defined by the positioning technology type.

The first wireless node 108 may be further configured to compute an initial position estimate for the first wireless node 108. The initial position estimate may represent an initial coordinate approximation for the first wireless node 108 in the geographical region. The initial position estimate may be computed based on the assigned weight value, the current position estimate, and the pairwise range estimate of the plurality of pairwise range estimates for each neighboring wireless node of the set of neighboring wireless nodes 110.

In accordance with an embodiment, the computation of the initial position estimate may be based on a ranging model (e.g., a two dimensional (2D) trilateration approach) that may be represented by a set of mathematical ranging equations between the first wireless node 108 and each neighboring wireless nodes of the set of neighboring wireless nodes 110. The first wireless node 108 may be configured to determine the initial position estimate by iterative determination of a solution for the set of mathematical ranging equations. For example, for "15" neighboring wireless nodes, a set of "15" ranging equations may be solved to optimally estimate an initial position estimate for the first wireless node 108. In the iterative determination of the solution for the set of mathematical ranging equations, the total ranging error between the first wireless node 108 and each neighboring wireless node of the set of neighboring wireless nodes 110 may be minimized.

The first wireless node 108 may be further configured to determine a final position estimate for the first wireless node 108 based on the computed initial position estimate and a correction estimate for the first wireless node 108. The correction estimate may correspond to a coordinate-correction that may be required to correct a deviation of the initial position estimate from an actual position of the first wireless node 108.

In accordance with an embodiment, the first wireless node 108 may be further configured to estimate the correction estimate for the first wireless node 108 by application of a Weighted Least Square (WLS) model on at least the plurality of ranging errors and a plurality of Euclidean distances between the first wireless node 108 and each neighboring wireless node of the set of neighboring wireless nodes 110. The final position estimate may be iteratively computed such that a sum of the plurality of ranging errors or a sum of a square of each of the plurality of ranging errors is minimum.

The first wireless node 108 may be further configured to share the final position estimate and the positioning technology type (used by the first wireless node 108) with the set of neighboring wireless nodes 110, via the wireless network 112. Similar to the first wireless node 108, each neighboring wireless node of the set of neighboring wireless nodes 110 may be configured to determine a respective final position estimate and share the respective final position estimate with their respective neighboring wireless nodes. As a result, over a given time period, different wireless nodes may determine their respective final position estimates in a collaborative or cooperative approach.

It may be noted that the determination of the final position estimate by the first wireless node 108 follows a decentralized (peer-to-peer) collaborative positioning approach (for example, described in FIG. 2), where each individual wireless node is responsible for updating its current position estimate based on information from neighboring wireless nodes in the wireless network 112. Also, each individual wireless node may autonomously decide to update and weigh different neighboring wireless nodes based on the positioning technology type employed by neighboring wireless nodes. However, in some embodiments, instead of the decentralized (peer-to-peer) collaborative positioning approach, a centralized collaborative positioning approach (described in FIG. 3) may be implemented. In the centralized collaborative positioning approach, the plurality of wireless nodes 104 may rely on the server 106 to determine the final position estimate for each wireless node of the plurality of wireless nodes 104 based on information, such as the current position estimate and positioning technology type, shared by each wireless node of the plurality of wireless nodes 104 with the server 106.

Figure 2:
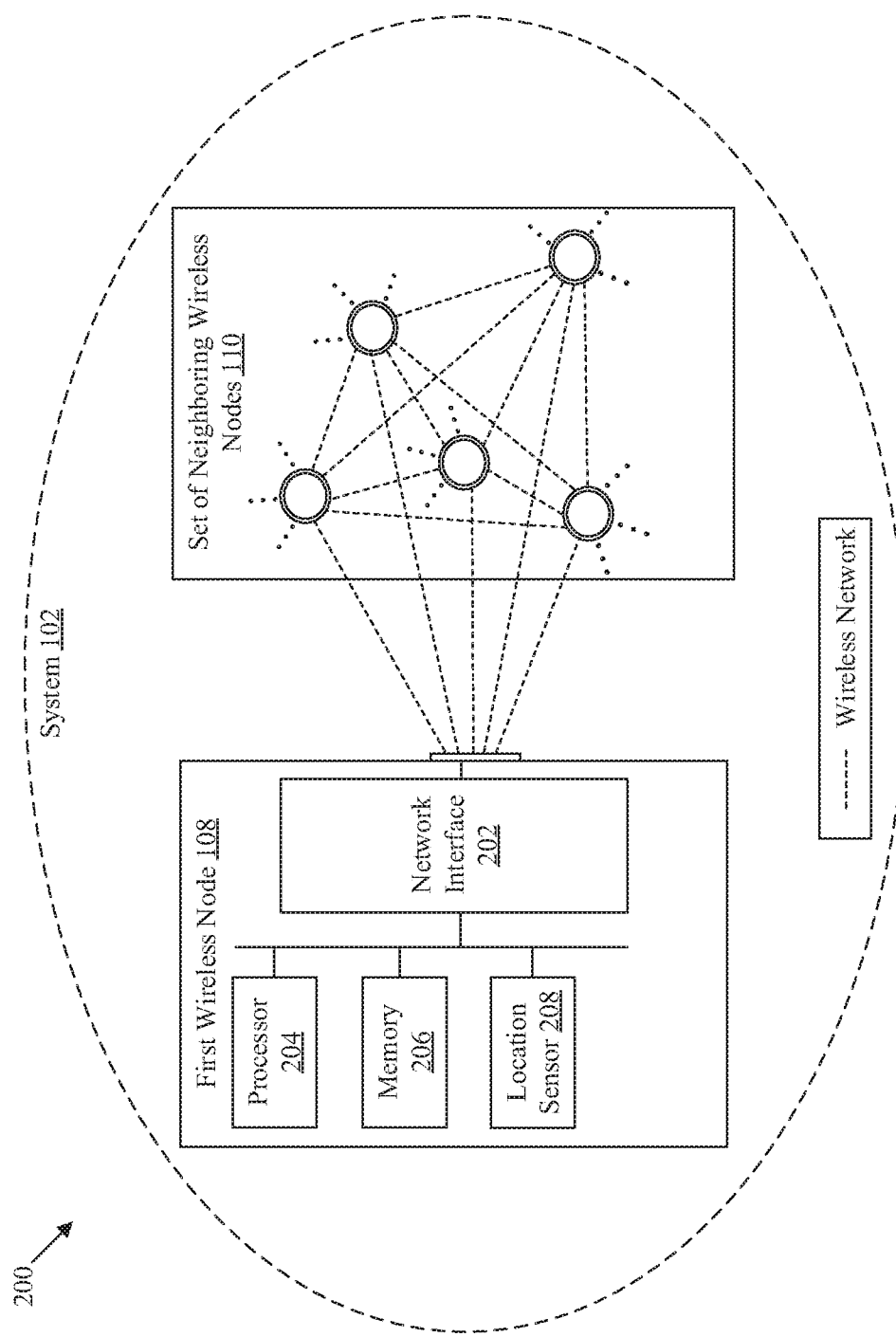
FIG. 2 illustrates a block diagram of an exemplary system for collaborative positioning of wireless nodes using pairwise range measurements and positioning technology type, in accordance with an embodiment of the disclosure.

FIG. 2 illustrates a block diagram of an exemplary system for collaborative positioning of wireless nodes using pair-wise range measurements and positioning technology type, in accordance with an embodiment of the disclosure. FIG. 2 is explained in conjunction with elements from FIG. 1. With reference to FIG. 2, there is shown the system 102 that includes the first wireless node 108 and the set of neighboring wireless nodes 110. The first wireless node 108 may be communicatively coupled to each of the set of neighboring wireless nodes 110, via the wireless network 112. The first wireless node 108 may include a network interface 202, a processor 204, a memory 206, and a location sensor 208. In some embodiments, each of the set of neighboring wireless nodes 110 may also include a network interface, a processor, a memory, and a location sensor. In other embodiments, only some of the neighboring wireless nodes may include a location sensor in addition to a processor and a memory.

The network interface 202 may be a wireless network interface. The network interface 202 may comprise suitable logic, circuitry, and interfaces that may be configured to communicate with the set of neighboring wireless nodes 110 and/or the server 106. The wireless network interface 202 may correspond to a wireless network interface controller (WNIC) that may operate in the first two layers (i.e., the physical layer and the data link layer) of the open system interconnection (OSI) model. The network interface 202 may implement known technologies to support wireless communication of the first wireless node 108 with the set of neighboring wireless nodes 110. The network interface 202 may include, but is not limited to an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The processor 204 may comprise suitable logic, circuitry, and interfaces that may be configured to determine final position estimate (i.e., precise coordinates) for the first wireless node 108 in a geographical region, using the collaborative positioning approach. Also, the processor 204 may be further configured to manage data communication requirements of the first wireless node 108. The data communication requirements may include, but are not limited to, wireless network configuration, wireless channel access, device registration on the wireless network 112, access to data packets, decryption, and data reconstruction, device authentication using an established protocol, and the like. The processor 204 may be implemented based on different processor technologies, wireless network adaptors, and specialized network circuits that may be known to one ordinarily skilled in the art. Examples of the processor 204 may include, but are not limited to, an x86-based processor, an x86-64-based processor, a Reduced Instruction Set Computing (RISC) processor, an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, and/or other processors or circuits.

The memory 206 may comprise suitable logic, circuitry, and/or interfaces that may be configured to store instructions executable by the processor 204. The memory 206 may be further configured to store information, such as a current position estimate from each of the set of neighboring wireless nodes 110 and current positioning information of the first wireless node 108. The memory 206 may be further configured to store metadata (e.g., a list of wireless nodes registered on the wireless network 112) related to positioning technology type used by different neighboring wireless nodes of the set of neighboring wireless nodes 110. The memory 206 may be further configured to store operating systems and associated applications. Examples of implementation of the memory 206 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The location sensor 208 may comprise suitable logic, circuitry, and/or interfaces that may be configured to generate current positioning information (e.g., raw positioning data) for the first wireless node 108. The location sensor 208 may be associated with a positioning technology type for the first wireless node 108. The positioning technology type may correspond to at least a location sensor type, a type of positioning technique, or a type of signal associated with the location sensor. For example, a type of positioning technique may be cellular positioning technique in Long Term Evolution (LTE) networks for wireless nodes associated with mobile user equipment (UE). Similarly, another type of positioning technique may be a PPP technique for GNSS receivers. Similarly, the type of signal may be dual frequency GNSS signals (e.g., "L1" and "L5" signals) for GNSS receivers, cellular RF signals, or cell-specific reference signals, such as Sounding Reference Signals (SRS) and Positioning Reference Signals (PRS) in LTE networks. Example of the location sensor 208 may include, but are not limited to, a GNSS receiver, an Assisted-GNSS receiver, or a reference station, such as a ground-based station that is aware of its accurate geo-location, an IMU, or a combination thereof. In some cases, the location sensor 208 may be a combination of a GNSS receiver and a ground-based station, such as a survey-grade base station.

In operation, each wireless node of the plurality of wireless nodes 104 may be configured to share a current position estimate and a positioning technology type with the first wireless node 108 and the set of neighboring wireless nodes 110 of the plurality of wireless nodes 104. The current position estimate may be an initial or final coordinate approximation of a wireless node based on the positioning technology type employed by the wireless node. The level of accuracy of the current position estimate may depend on the positioning technology type used by the corresponding wireless node. The positioning technology type may correspond to at least a location sensor type, a type of positioning technique, or a type of signal associated with the location sensor 208. In some embodiments, the position technology type may correspond to one of GNSS-based positioning technology, a cellular positioning technology, an inertial measurement-based positioning technology, or a combination thereof.

As an example, a wireless node (A) may include a GNSS receiver that uses "L1" signals only to determine the current position estimate in a geographical region. A wireless node (B) may include a GNSS receiver that uses dual frequency GNSS signals, such as "L1" and "L5" signals. A wireless node (C) may include a GNSS receiver that may use at least a differential GNSS (D-GNSS)-based positioning technique, a PPP technique, a Real-Time Kinematic (RTK) technique, or a combination thereof, to determine the current position estimate for itself. A wireless node (D) may include an A-GNSS receiver that may use a reference station, such as an eNodeB (eNB in an Evolved Universal Terrestrial Radio Access (E-UTRA) LTE network), to determine the current position estimate for itself.

As another example, a wireless node (E) may be registered on a cellular network, such as an LTE network. In such a case, the wireless node (E) may rely on a cellular positioning method. Examples of the cellular positioning method may include, but is not limited to, LTE Positioning Protocol (LPP), Secure User Plane Location (SUPL), Enhanced-Cell Id (CID), Observed Time Difference of Arrival (OTDOA), Uplink Time Difference of Arrival (UTDOA), and other RF Fingerprinting methods. The cellular positioning methods may be known to one ordinarily skilled in the art. Thus, the details of different cellular positioning methods are omitted from the disclosure for the sake of brevity.

As another example, a wireless node (F) may implement a hybrid positioning approach. In one hybrid positioning approach, for example, the wireless node (F) may implement both a cellular positioning method and a GNSS receiver to determine the current position estimate for itself. In another hybrid positioning approach, for example, the wireless node (F) may implement an inertial measurement unit (IMU) (based on the gyroscope and/or accelerometer data) and a GNSS receiver to determine the current position estimate for itself.

The level of accuracy of the current position estimate may differ for each of the wireless node (A), the wireless node (B), the wireless node (C), the wireless node (D), the wireless node (E), and the wireless node (F). The level of accuracy of the current position estimate may depend on the difference in a relative accuracy offered by different positioning technology types employed by each of the wireless nodes (A, B, C, D, E, and F). In some cases, the level of accuracy of the current position estimate may further depend on several factors that may be known in the art. Some of the factors may include, but are not limited to, SNR levels of RF signals (indicative of the current positioning information), multi-path reflections, physical obstructions (e.g., mountains, tunnels, etc.), geographic or atmospheric conditions, low satellite visibility for GNSS receivers, and a relative speed or acceleration of the wireless node in a coverage area.

In accordance with an embodiment, the processor 204 may be configured to receive assistance data associated with the set of neighboring wireless nodes 110. The assistance data may be received from the server 106, a reference station, or a neighboring wireless node of the set of neighboring wireless nodes 110. The assistance data may include pairing information that indicates a likelihood of whether the set of neighboring wireless nodes 110 may be paired with the first wireless node 108. For example, the pairing information may include a trusted certificate, a secure digital signature, a public/private key pair, and a list of neighboring nodes that have suitable power levels for uninterrupted communication. The processor 204 may be further configured to select the set of neighboring wireless nodes 110 to receive the current position estimate and the positioning technology type based on the received assistance data.

The processor 204 may be configured to estimate a plurality of pairwise range estimates between the first wireless node 108 and each neighboring wireless node of the set of neighboring wireless nodes 110. Each pairwise range estimate of the plurality of pairwise range estimates may be estimated by application of a ranging technique between the first wireless node 108 and a neighboring wireless node of the set of neighboring wireless nodes 110. The ranging technique may be one of a Received Signal Strength (RSS)-based ranging technique, Time of Arrival (TOA)-based ranging technique, or a Round Trip Delay (RTD)-based ranging technique. In three dimensions (3D), each pairwise range estimate may correspond to a sphere whose center coincides with a position (i.e., XYZ coordinates) of a corresponding neighboring wireless node. In two dimensions (2D), each pairwise range estimate may correspond to a circle whose center coincides with the position (i.e., x-y coordinates) of the corresponding neighboring wireless node. The radius of the sphere or the circle may be equal to the pairwise range estimate.

As an example, in the TOA-based ranging technique, the first wireless node 108 (j), i.e., an unknown location node, may be configured to measures a time (td) for a message (in the form of an RF signal) to travel to or from a neighboring wireless node (i). A pairwise range estimate (dij) may correspond to the intra-node distance that is based on the time (td) and the speed of light (c).

The processor 204 may be further configured to estimate a plurality of ranging errors between the first wireless node 108 and each neighboring wireless node of the set of neighboring wireless nodes 110. The plurality of ranging errors may be estimated based on a plurality of Euclidean distances and the plurality of pairwise range estimates between the first wireless node 108 and each neighboring wireless node of the set of neighboring wireless nodes 110. More specifically, each ranging error of the plurality of ranging errors may be estimated by application of a ranging model on a pair of a Euclidean distance of the plurality of Euclidean distances and a pairwise range estimate of the plurality of pairwise range estimates. The ranging model may be a 2D geometrical model, such as trilateration model, or a 3D geometrical model to represent each ranging error as a function of a Euclidean distance and a pairwise range estimate between the first wireless node 108 and a corresponding neighboring wireless node of the set of neighboring wireless nodes 110.

As an example, the 2D geometrical model, such as a trilateration model, may be employed as the ranging model to solve for the position of the first wireless node 108 (e.g., a radio device) using either the RSS-based ranging technique, the TOA-based ranging technique, or the RTD-based ranging technique. The 2D geometrical model may be given by equation (1), as follows:

$$d_{ij} = F(x_j, y_j) = \sqrt{(x_j - x_i)^2 + (y_j - y_i)^2} + e_{ij} \quad (1)$$

where, $d_{ij}$ is the pairwise range estimate between the first wireless node 108 (i.e., $j^{th}$ node) and a neighboring wireless node (i.e., $i^{th}$ node);

$(x_1, y_j)$ are the x-y coordinates for the first wireless node 108, i.e., $j^{th}$ node;

$(x_i, y_i)$ are the known x-y coordinates (i.e., the current position estimate) for the neighboring wireless node, i.e., $i^{th}$ node; and $e_{ij}$ is the ranging error in the ranging measurement which follows a Gaussian distribution $N(\mu, \sigma^2)$, with a mean $\mu$ and a variance $\sigma^2$. When dij is biased, p is non zero. The x-y coordinates $(x_i, y_i)$ for the neighboring wireless node may be the current position estimate of the neighboring wireless node (i.e., $i^{th}$ neighboring wireless node). The current position estimate $(x_i, y_i)$ may be received by the first wireless node 108, via the network interface 202.

The processor 204 may be configured to receive the current position estimate and the positioning technology type of each neighboring wireless node of the set of neighboring wireless nodes 110, via the wireless network 112. The positioning technology type may correspond to at least a location sensor type, a type of positioning technique, or a type of signal associated with the location sensor 208. The current position estimate of each neighboring wireless node may be used as known coordinate values in the ranging model (such as the ranging model given by equation (1)) against unknown or imprecise coordinate values of the first wireless node 108. The processor 204 may be further configured to assign a weight value to each neighboring wireless node of the set of neighboring wireless nodes 110 based on the positioning technology type of a corresponding neighboring wireless node of the set of neighboring wireless nodes 110.

For example, the positioning technology type of a neighboring wireless node (P) may correspond to a GNSS receiver that uses "L1" and "L2" GNSS signals and the positioning technology type of a neighboring wireless node (Q) may correspond to a GNSS receiver and an inertial measurement unit (IMU). In some cases, the accuracy of the positioning technology type employed by a neighboring wireless node (Q) may be better than that by the neighboring wireless node (P). In such cases, the processor 204 may be configured to assign a higher weight value, for example, "0.7" to the neighboring wireless node (Q) and "0.5" to the neighboring wireless node (P). Here, "0.7" and "0.5" may correspond to normalized weight values between "0 and 1".

As an example, let $e_{ij}$ be the ranging error for a ranging measurement between the first wireless node 108 (i.e., $j^{th}$ node) and the neighboring wireless node (i.e., $i^{th}$ node). The processor 204 may be configured to minimize a summation of a square of the plurality of ranging errors. For each pair of the first wireless node 108 (i.e., $j^{th}$ node) and a neighboring wireless node, i.e., $i^{th}$ node of the set of neighboring wireless nodes 110, the summation (S) for the plurality of ranging errors may be given by equation (2), as follows:

$$S = \sum_{ij} e_{ij}^2 \quad (2)$$

In equation (2), a squared-error model of the ranging error ($e_{ij}$) is employed. The value of the sum (S) of the plurality of ranging errors may be sensitive to variations in case significant ranging error is present in the measurement of one or more pairwise range estimates of the plurality of pairwise range estimates.

In some cases, instead of the squared-error model, M-estimators may be used to compute a summation ($S_m$) for the plurality of ranging errors. The use of M-estimators may reduce the effect of large ranging errors based on the replacement of the squared error $e_{ij}^2$, by another function for the ranging error, i.e. $\rho(e_{ij})$. The summation ($S_m$) may be given by equation (3), as follows:

$$S_m = \min \sum_{ij} \rho(e_{ij}) \quad (3)$$

wherein $\rho$ is a symmetric, positive function with a unique minimum at zero, and is chosen to be less increasing than the square function in $e_{ij}^2$.

In some cases, the processor 204 may be configured to iteratively compute a summation ($S_w$) for the plurality of ranging errors as a weighted sum of a square of each of the plurality of ranging errors. The summation ($S_w$) may be iteratively computed until a minimum value of the summation ($S_w$) is obtained. For each pair of the first wireless node 108 (i.e. $j^{th}$ node) and a neighboring wireless node, i.e. $i^{th}$ node of the set of neighboring wireless nodes 110, the summation ($S_w$) may be given by equation (4), as follows:

$$S_w = \min \sum_{ij} w(e_{ij}[n-1])e_{ij}^2 \quad (4)$$

where, [n] indicates the iteration number; and w(•) is a weighting function that corresponds to assigned weight values based different metrics, such as the positioning technology type employed by each corresponding neighboring wireless node, e.g., the neighboring wireless node (i).

In some cases, the ranging model may be represented as a non-linear problem and initial values may be found for different parameters in the ranging model. These different parameters may be refined iteratively, in which values may be obtained by successive approximations. In such cases, the ranging error may be minimized using a Least Square (LS)-estimation for the non-linear problem. For example, a first-order Taylor series approximation may be used to linearize the ranging model given by equation (1). The linearized form may be given by equation (5), as follows:

$$d_{ij} \approx d_{i_0,j_0} + \left(\frac{dd_{ij}}{dx_i}\right)_0 dx_i + \left(\frac{dd_{ij}}{dy_i}\right)_0 dy_i + \left(\frac{dd_{ij}}{dx_j}\right)_0 dx_j + \left(\frac{dd_{ij}}{dy_j}\right)_0 dy_j + H.O.T + e_{ij} \quad (5)$$

Where,

H.O.T may correspond to higher order terms of Taylor series expansion; and $$\left(\frac{dd_{ij}}{dx_i}\right)_0 \text{ and } \left(\frac{dd_{ij}}{dy_i}\right)_0$$

may be the partial derivatives of a pairwise range estimate ($d_{ij}$) with respect to $x_i$ and $y_i$.

$$\left(\frac{dd_{ij}}{dx_i}\right)_0 \text{ and } \left(\frac{dd_{ij}}{dy_i}\right)_0$$

may be estimated with an initial position estimate for the first wireless node 108 ($j^{th}$ node) given by coordinate value approximates ($x_{j0}$, $y_{j0}$). The H.O.T may be dropped from the Taylor series expansion (given by equation (5)) to obtain a linear approximation of the equation (5).

From equation (5), there may be four unknowns (as shown in equation (7)) per wireless node, such as the first wireless node 108. These four unknowns may include two initials coordinate approximations (shown as $x_{j_0}, y_{j_0}$ in equation (7)) and two coordinate corrections (shown as $dx_j$, $dy_j$ in equation (7)) for the two initials coordinate approximations.

In order to estimate a final position estimate, i.e. a precise position of the first wireless node 108, computation of an initial position estimate and a correction estimate may be required. The processor 204 may be further configured to compute the initial position estimate for the first wireless node 108 based on the assigned weight value, the current position estimate, and a pairwise range estimate of the plurality of pairwise range estimates for each neighboring wireless node of the set of neighboring wireless nodes 110. The initial position estimate may be computed using a minimum number of neighboring wireless nodes and different weight metrics, such as a ranging uncertainty, the assigned weight values, and the positioning technology type employed by each neighboring wireless node of the set of neighboring wireless nodes 110. In some embodiments, the processor 204 may be further configured to compute the initial position estimate for the first wireless node 108 further based on the plurality of ranging errors between the first wireless node 108 and each neighboring wireless node of the set of neighboring wireless nodes 110. As an example, $(x_{j0}, y_{j0})$ may represent the initial position estimate for the first wireless node 108 based on a linear approximation of the ranging model given by equation (5).

In accordance with an embodiment, the processor 204 may be further configured to estimate the correction estimate for the first wireless node 108 by application of a Weighted Least Square (WLS) model on at least the plurality of ranging errors and a plurality of Euclidean distances between the first wireless node 108 and each neighboring wireless node of the set of neighboring wireless nodes 110. The correction estimate may compensate for the plurality of ranging errors in the estimation of the plurality of pairwise range estimates between the first wireless node 108 and each of the set of neighboring wireless nodes 110.

As an example, the weighted LS estimation for the correction estimate, i.e., a set of unknown coordinate corrections, may be given by equation (6), as follows:

$$\hat{\Theta} = (J^T W J)^{-1} J^T W K = N^{-1} J^T W K \quad (6)$$

where, $$\Theta = \underbrace{\begin{bmatrix} dx_i \\ dy_i \\ dx_j \\ dy_j \\ \vdots \\ dx_n \\ dy_n \end{bmatrix}}_{2z \times 1}$$

$\Theta$ is the correction estimate, i.e. set of unknown coordinate corrections for the first wireless node 108 (such as an unknown radio device), and z is the number of neighboring wireless nodes within the set of neighboring wireless nodes 110. In case of a handset-based system, z may be equal to 1;

$$J = \underbrace{\begin{bmatrix} \overline{\frac{\partial F_1}{\partial x_i} \frac{\partial F_1}{\partial y_i}} & \cdots & \overline{\frac{\partial F_1}{\partial x_n} \frac{\partial F_1}{\partial y_n}} \\ \vdots & \ddots & \vdots \\ \overline{\frac{\partial F_m}{\partial x_i} \frac{\partial F_m}{\partial y_i}} & \cdots & \overline{\frac{\partial F_m}{\partial x_n} \frac{\partial F_m}{\partial y_n}} \end{bmatrix}}_{m \times 2z}$$

J is the Jacobean matrix for the unknown coordinate values of the first wireless node 108, $F_m$ may correspond to $m_{th}$ Euclidean distance, and m may correspond to a number of observations associated with a number of pairwise range estimates;

$$W = Q^{-1} = \underbrace{\text{diag}[\sigma_{ij}^2 \; \cdots \; \sigma_{mm}^2]}_{m \times m}$$

W is the weighting matrix that may be equal to the inverse of the variance-covariance matrix Q of the plurality of pairwise range estimates (e.g., dij);

$$K = \underbrace{\begin{bmatrix} \hat{l}_{ij} - F_{ij} \\ \vdots \\ \hat{l}_{th} - F_{th} \end{bmatrix}}_{m \times 1}$$

K is a misclosure vector that is the difference between the observed pairwise range estimates ($d_{ij}$) and the Euclidean distances $l_{ij}$ evaluated from the estimated coordinates; and $N = (J^T W J)$ is a normal matrix.

The processor 204 may be further configured to determine a final position estimate for the first wireless node 108 based on the computed initial position estimate and the correction estimate for the first wireless node 108. The final position estimate may serve as precise coordinate values for the first wireless node 108 in the wireless network 112 using the collaborative positioning approach. As an example, from equation (5), $(x_j, y_j)$ may be the final position estimate (i.e. the unknown coordinates) for the first wireless node 108 and $\Theta$ (such as $dx_j$ and $dy_j$) may be the correction estimate (i.e. unknown coordinate corrections) to the initial position estimate (i.e. coordinate value approximates). $(x_j, y_j)$ may be estimated by equation (7), as follows:

$$x_j = x_{j0} + dx_j$$

$$y_j = y_{j0} + dy_j \quad (7)$$

In accordance with an embodiment, the processor 204 may be further configured to identify an activity of a neighboring wireless node of the set of neighboring wireless nodes 110 as a malicious activity in the wireless network 112. The activity may be identified as the malicious activity when a corresponding ranging error of a plurality of ranging errors for a neighboring wireless node is greater than a threshold value. In such cases, the processor 204 may be further configured to share blocking information associated with the neighboring wireless node to each of the set of neighboring wireless nodes 110. The blocking information may include details of the malicious activity of the neighboring wireless node. Also, in some cases, the processor 204 may be configured to raise a request to deregister such neighboring wireless node from the wireless network 112.

In continuation to the collaborative positioning approach, the first wireless node 108 may be configured to share the final position estimate with each of the set of neighboring wireless nodes 110. In a similar manner, a corresponding final position estimate may be computed by each neighboring wireless node based on the shared final position estimates from different neighboring wireless nodes. Within a specific time period, each of the plurality of wireless nodes 104 may be configured to determine their final position estimate based on shared information (current position estimates and final position estimates) from other neighboring wireless nodes of the plurality of wireless nodes 104. The final position estimate may be indicative of a minimum positioning error (in terms of coordinate values) with respect to the actual position of the corresponding wireless node.

In some embodiments, each of the plurality of wireless nodes 104 in the wireless network 112 may be configured to update their respective final position estimate at a refresh rate. The refresh rate may correspond to a frequency of re-estimation of the final position estimate of each of the plurality of wireless nodes 104 in the wireless network 112. The refresh rate may be preset in the memory 206 or may be selected by each wireless node based on different factors, such as a mobility of different wireless nodes, a speed of different wireless nodes, and an overall delay in the determination of the final position estimate for the plurality of wireless nodes 104.

Figure 3:
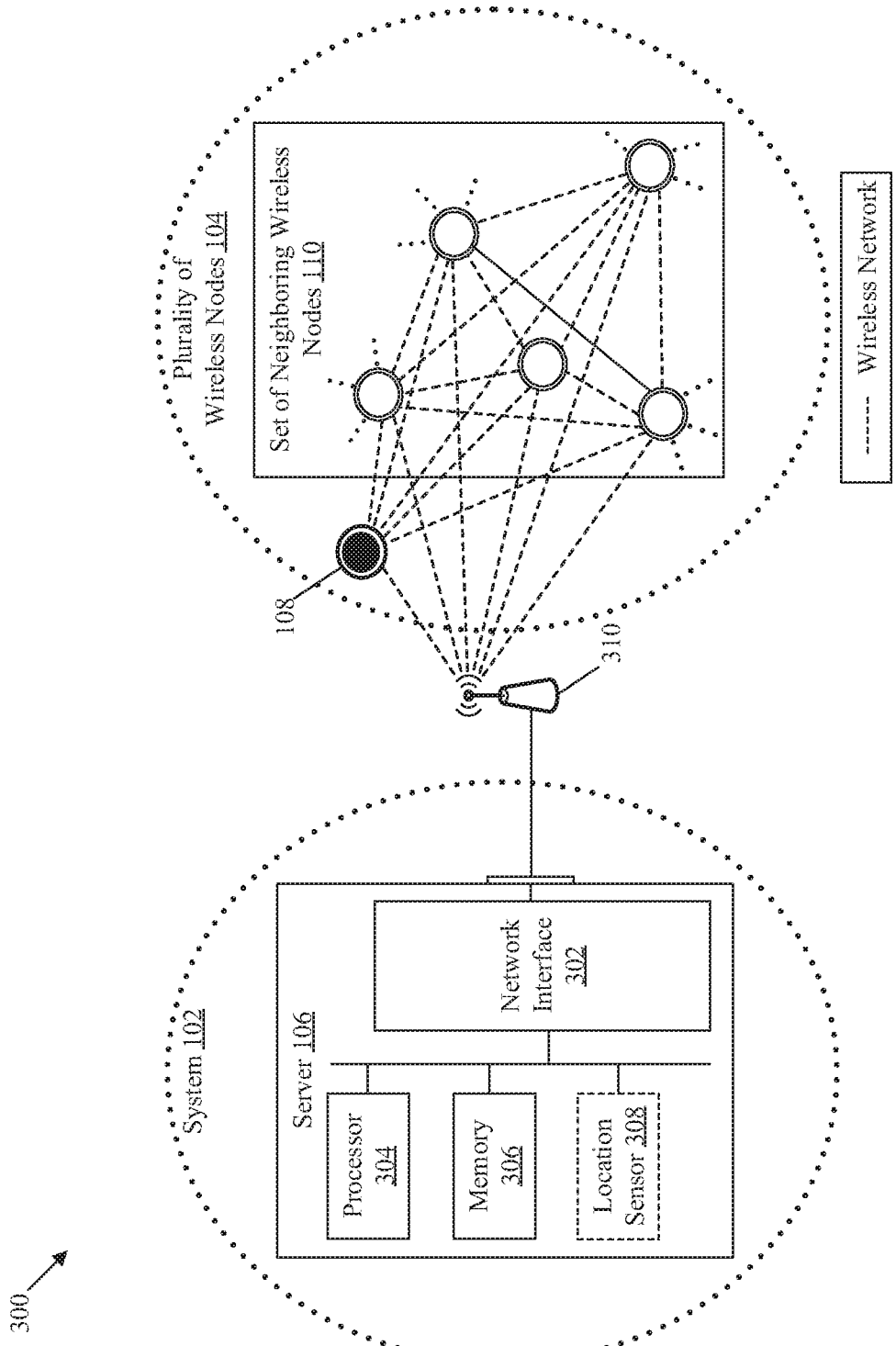
FIG. 3 illustrates a block diagram of an exemplary system for collaborative positioning of wireless nodes using pairwise range measurements and positioning technology type, in accordance with another embodiment of the disclosure.

FIG. 3 illustrates a block diagram of an exemplary system for collaborative positioning of wireless nodes using pairwise range measurements and positioning technology type, in accordance with another embodiment of the disclosure. With reference to FIG. 3, there is shown the system 102 that includes the server 106. The server 106 may include a network interface 302, a processor 304, and a memory 306. In some embodiments, the server 106 may also include a location sensor 308. In such cases, the server 106 may also act as a location server for the plurality of wireless nodes 104. The server 106 may be communicatively coupled to the first wireless node 108 and the set of neighboring wireless nodes 110, via a wireless access point 310. The first wireless node 108 may be communicatively coupled to each of the set of neighboring wireless nodes 110, via the wireless network 112 (represented by dashed lines). In some embodiments, each of the plurality of wireless nodes 104 may include a location sensor. In other embodiments, only some of the wireless nodes of the plurality of wireless nodes 104 may include a location sensor. Each of the plurality of wireless nodes 104 may include a dedicated network interface to communicate with each other and the server 106.

The network interface 302 may be a wired or a wireless network interface. The network interface 302 may comprise suitable logic, circuitry, and interfaces that may be configured to communicate with the plurality of wireless nodes 104, via the wireless access point 310. In some embodiments, the network interface 302 may correspond to a wireless network interface controller (WNIC) that may operate in the first two layers (i.e., the physical layer and the data link layer) of the open system interconnection (OSI) model.

The network interface 302 may implement known technologies to support wireless communication of the first wireless node 108 with the set of neighboring wireless nodes 110. The network interface 302 may include, but is not limited to an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer.

The processor 304 may comprise suitable logic, circuitry, and interfaces that may be configured to determine a final position estimate (i.e., precise coordinates) of each wireless node of the plurality of wireless nodes 104 in a geographical region, using the collaborative positioning approach. In some embodiments, the processor 304 may be further configured to handle data communication requirements of the plurality of wireless nodes 104. The data communication requirements may include, but are not limited to, wireless network configuration, wireless channel access, device registration on the wireless access point 310, access to data packets, decryption, message reconstruction, and device authentication using an established protocol, and the like. The processor 304 may be implemented based on different processor technologies, wireless network adaptors, and specialized network circuits that may be known to one ordinarily skilled in the art. Examples of the processor 304 may include, but are not limited to, an x86-based processor, an x86-64-based processor, a Reduced Instruction Set Computing (RISC) processor, an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, and/or other processors or circuits.

The memory 306 may comprise suitable logic, circuitry, and/or interfaces that may be configured to store instructions executable by the processor 304. The memory 306 may be further configured to store information, such as a current position estimate from each of the plurality of wireless nodes 104. The memory 306 may be further configured to store metadata related to positioning technology type used by different wireless nodes of the plurality of wireless nodes 104. For example, the metadata may include a list of wireless nodes registered on the wireless network 112 and/or the wireless access point 310. The memory 306 may be further configured to store operating systems and associated applications. Examples of implementation of the memory 306 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The location sensor 308 may comprise suitable logic, circuitry, and/or interfaces that may be configured to generate current positioning information (such as raw positioning data) for the server 106. The location sensor 308 may be associated with a positioning technology type for the server 106. The positioning technology type may correspond to at least a location sensor type, a type of positioning technique, or a type of signal associated with the location sensor 308. For example, a type of positioning technique may correspond to the use of a survey-grade GNSS receiver. Example of the location sensor 208 may include, but are not limited to, a GNSS receiver, an Assisted-GNSS receiver, or a reference station, such as a ground-based station that is aware of its accurate geolocation, an IMU, or a combination thereof. In some cases, the location sensor 208 may be a combination of a GNSS receiver and a ground-based station, such as a survey-grade base station.

In operation, the processor 304 may be configured to communicate with the plurality of wireless nodes 104 communicatively coupled to each other and the server 106. Each wireless node of the plurality of wireless nodes 104 may share a current position estimate and a positioning technology type with the set of neighboring wireless nodes 110 of the plurality of wireless nodes 104 and the server 106. The current position estimate may be an initial coordinate approximation (or an accurate position estimate) of a corresponding wireless node. The level of accuracy of the current position estimate may depend on the positioning technology type used by the corresponding wireless node. The position technology type may correspond to one of GNSS-based positioning technology, a cellular positioning technology, an inertial measurement-based positioning technology, or a combination thereof.

In some embodiments, a location sensor in each of the plurality of wireless nodes 104 may be configured to output current positioning information (e.g., raw positioning information) of the corresponding wireless node of the plurality of wireless nodes 104. As an example, the raw positioning information from a wireless node may include pseudorange estimates, phase shift, and/or clock bias for a GNSS receiver in the wireless node. Each of the plurality of wireless nodes 104 may share the current positioning information with the server 106, via the wireless access point 310. In such cases, the processor 304 may be configured to compute the current position estimate of each of the plurality of wireless nodes 104 based on the current positioning information.

The collaborative positioning approach is described herein for the first wireless node 108 of the plurality of wireless nodes 104. The same approach may be applied for each wireless node of the plurality of wireless nodes 104. The processor 304 may be configured to estimate a plurality of pairwise range estimates between the first wireless node 108 of the plurality of wireless nodes 104 and each neighboring wireless node of the set of neighboring wireless nodes 110. A pairwise range estimate of the plurality of pairwise range estimates may correspond to an inter-node distance between a pair of the first wireless node 108 and a neighboring wireless node of the set of neighboring wireless nodes 110. Each pairwise range estimate of the plurality of pairwise range estimates may be estimated by application of a ranging technique between the first wireless node 108 and a neighboring wireless node of the set of neighboring wireless nodes 110. The ranging technique may be one of a Received Signal Strength (RSS)-based ranging technique, Time of Arrival (TOA)-based ranging technique, or a Round Trip Delay (RTD)-based ranging technique. A ranging model may be employed to solve for the position of the first wireless node 108 (e.g., a radio device) using either the RSS-based ranging technique, the TOA-based ranging technique, or the RTD-based ranging technique. An example of the ranging model in the form of a 2D geometrical approach is given in equation (1).

Each pairwise range estimate may be associated with a ranging noise or a ranging error in the estimation of the corresponding pairwise range estimate. The processor 304 may be further configured to estimate a plurality of ranging errors between the first wireless node 108 and each neighboring wireless node of the set of neighboring wireless nodes 110. Each ranging error may follow a Gaussian distribution N ($\mu$, $\sigma^2$), with a mean p and a variance $\sigma^2$. In accordance with an embodiment, the plurality of ranging errors may be estimated based on a plurality of Euclidean distances and the plurality of pairwise range estimates between the first wireless node 108 and each neighboring wireless node of the set of neighboring wireless nodes 110. An example of the ranging error in the ranging model is represented by equation (1).

The processor 304 may be further configured to receive the current position estimate and the positioning technology type of the first wireless node 108 and each neighboring wireless node of the set of neighboring wireless nodes 110. The processor 304 may be further configured to assign a weight value to each neighboring wireless node of the set of neighboring wireless nodes 110 based on the positioning technology type of a corresponding neighboring wireless node of the set of neighboring wireless nodes 110. The assigned weight value may be indicative of a level of accuracy of the current position estimate for a corresponding neighboring wireless node of the set of neighboring wireless nodes 110. The level of accuracy of the current position estimate may depend on the positioning technology type employed by the corresponding wireless node.

The processor 304 may be further configured to compute an initial position estimate for the first wireless node 108. The initial position estimate may be computed based on the assigned weight value, the current position estimate, and a pairwise range estimate of the plurality of pairwise range estimates for each neighboring wireless node of the set of neighboring wireless nodes 110. In accordance with an embodiment, the processor 304 may be configured to compute the initial position estimate for the first wireless node 108 further based on the plurality of ranging errors between the first wireless node 108 and each neighboring wireless node of the set of neighboring wireless nodes 110. The initial position estimate may correspond to a set of initial unknown coordinate approximates for the first wireless node 108. A coordinate correction, i.e. a correction estimate, may be required to correct the initial position estimate. The coordinate correction may offset the value of the initial position estimate and reduce the effect of ranging error in the determination of a final position estimate for the first wireless node 108.

The processor 304 may be configured to estimate the correction estimate. i.e., position adjustment, for the first wireless node 108. The correction estimate may be estimated by application of a weighted least square (LS) model on at least a plurality of ranging errors and a plurality of Euclidean distances between the first wireless node 108 and each neighboring wireless node of the set of neighboring wireless nodes 110. An example of the Weighted Least Square (WLS) model is given by equation (6). The processor 304 may be further configured to determine the final position estimate for the first wireless node 108 based on the computed initial position estimate and the correction estimate for the first wireless node 108. An example of the determination of the final position estimate is given by equation (6).

In continuation to the collaborative positioning approach, the processor 304 may be further configured to share the final position estimate of the first wireless node 108 with each of the set of neighboring wireless nodes 110. In a similar manner, the processor 304 may be further configured to determine final position estimates for other neighboring wireless nodes of the set of neighboring wireless nodes 110 based on the final position estimates shared with other neighboring wireless nodes and across different wireless nodes of the plurality of wireless nodes 104. Within a specific time period, each of the plurality of wireless nodes 104 may get updated with the final position estimate that may be indicative of a minimum positioning error (in terms of coordinate values) with respect to the actual position of the corresponding wireless node.

In some embodiments, the aforementioned collaborative positioning approach may be iteratively executed by the processor 304 at a refresh rate. The refresh rate may correspond to a frequency of re-estimation of the final position estimate of each of the plurality of wireless nodes 104. The refresh rate may be present in the memory 306 or may be selected by the processor 304 based on different factors, such as a mobility of different wireless nodes, a speed of different wireless nodes, or an overall delay in the determination of the final position estimate for the plurality of wireless nodes 104.

Figure 4:
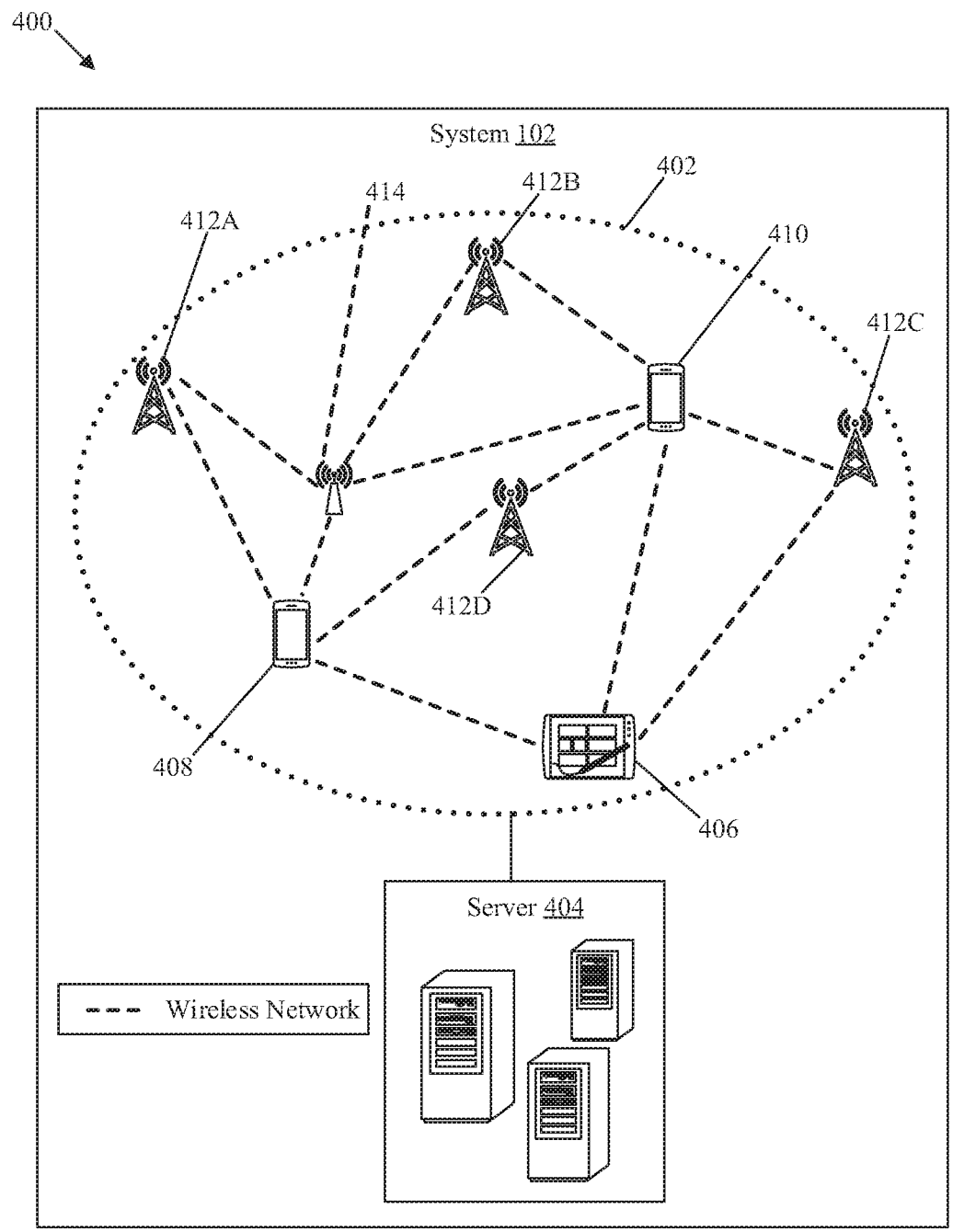
FIG. 4 illustrates an exemplary scenario for collaborative positioning of radio devices based on knowledge of a type of Global Navigation Satellite System (GNSS) technology used in each radio device, in accordance with an embodiment of the disclosure.

FIG. 4 illustrates an exemplary scenario for collaborative positioning of radio devices based on knowledge of a type of (Global Navigation Satellite System) GNSS technology used in each radio device, in accordance with an embodiment of the disclosure. FIG. 4 is explained in conjunction with elements from FIGS. 1, 2, and 3. With reference to FIG. 4, there is shown an exemplary scenario 400 for collaborative position adjustment of radio devices based on knowledge of a type of GNSS technology used in each radio device. In the exemplary scenario 400, there is shown a plurality of radio devices 402 within a geographical region (represented by a dotted circle) and a server 404 communicatively coupled to the plurality of radio devices 402. The plurality of radio devices 402 may correspond to the plurality of wireless nodes 104. The plurality of radio devices 402 may include a hybrid GNSS-enabled radio device 406, a dual frequency GNSS-enabled radio device 408, a single frequency GNSS-enabled radio device 410, a plurality of known location radio stations 412A, 412B, 412C, and 412D, and a PPP-enabled radio device 414. In FIG. 4, dashed lines may represent wireless networks established between different pairs of radio devices of the plurality of radio devices 402.

In the exemplary scenario 400, each radio device of the plurality of radio devices 402 may be associated with a different positioning technology type. For example, the different positioning technology type may correspond to a hybrid GNSS receiver in the hybrid GNSS-enabled radio device 406, a dual frequency positioning method employed by the dual frequency GNSS-enabled radio device 408, a single frequency positioning method employed by the single frequency GNSS-enabled radio device 410, and the like.

In accordance with an embodiment, each radio device of the plurality of radio devices 402 may be configured to share a current position estimate and the positioning technology type employed by the corresponding radio device, with each other and the server 404, via the wireless network 112. The server 404 may be configured to receive the current position estimate and the positioning technology type employed by each radio device of the plurality of radio devices 402.

The level of accuracy of the current position estimate may be based on the positioning technology type employed by individual radio devices in the geographical region. For example, the current position estimate for the hybrid GNSS-enabled radio device 406 may be more accurate than that for the single frequency GNSS-enabled radio device 410 but less accurate than that of PPP-enabled radio device 414. The plurality of known location radio stations 412A, 412B, 412C, and 412D may be fixed stations whose current position estimates may be mapped to a fixed known location by a survey grade GNSS receiver. Thus, the current position estimate of each of plurality of known location radio stations 412A, 412B, 412C, and 412D may be most accurate among the plurality of radio devices 402. In some embodiments, each of plurality of known location radio stations 412A, 412B, 412C, and 412D may correspond to anchor nodes in the geographical region and the current position estimate of each of plurality of known location radio stations 412A, 412B, 412C, and 412D may act as a reference position value for the collaborative position adjustment of remaining radio devices of the plurality of radio devices 402.

The server 404 may be configured to assign a weight value to each radio device of the plurality of radio devices 402 based on the received positioning technology type employed by the corresponding radio device of the plurality of radio devices 402. The collaborative positioning approach described in FIGS. 2 and 3 may be also applicable to the plurality of radio devices 402, without a deviation from the scope of the present disclosure. Thus, the details of the collaborative positioning approach are omitted from FIG. 4 of the disclosure for the sake of brevity.

Figure 5:
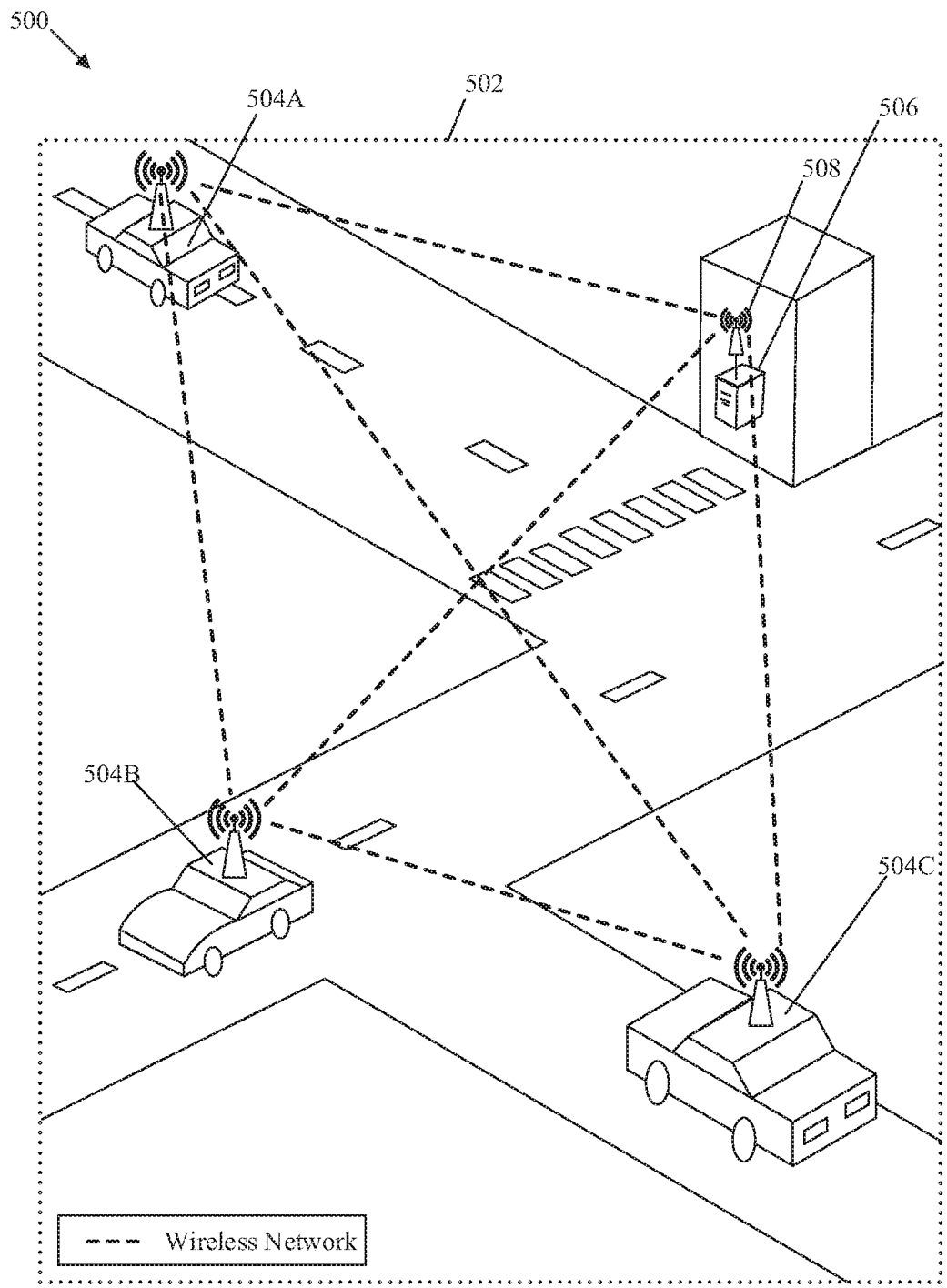
FIG. 5 illustrates an exemplary scenario for collaborative positioning of vehicles based on knowledge of a type of GNSS technology used in each vehicle, in accordance with an embodiment of the disclosure.

FIG. 5 illustrates an exemplary scenario for collaborative positioning of vehicles based on knowledge of a type of GNSS technology used in each vehicle, in accordance with an embodiment of the disclosure. FIG. 5 is explained in conjunction with elements from FIGS. 1, 2, 3, and 4. With reference to FIG. 5, there is shown an exemplary scenario 500 for collaborative position adjustment of vehicles based on knowledge of a type of GNSS technology used in each vehicle.

In the exemplary scenario 500, there is shown a vehicular communication system 502 that includes a plurality of vehicles 504A, 504B, and 504C and a server 506. The plurality of vehicles 504A, 504B, and 504C may be communicatively coupled to each other and the server 506, via a wireless network (such as the wireless network 112). In some embodiments, the plurality of vehicles 504A, 504B, and 504C may be communicatively coupled to each other and the server 506, via a dedicated wireless access point (WAP) 508. In such cases, the WAP 508 may be configured to enable communication of the plurality of vehicles 504A, 504B, and 504C with each other and the server 506.

In FIG. 5, the vehicular communication system 502 is depicted as a Vehicle-to-Vehicle (V2V) communication system and/or a Vehicle-to-Infrastructure (V2I) communication system. However, the disclosure may not be so limited, and in some embodiments, the vehicular communication system 502 may be a Vehicle-to-Everything (V2X) communication system. In the V2X communication system, different devices, vehicles, networks (e.g., cellular networks), user-equipment, and power grids may be communicatively coupled to each other. Also, in some embodiments, the vehicular communication system 502 may be a V2I communication system, a V2V communication system, a Vehicle-to-network (V2N) communication system, a Vehicle-to-Pedestrian (V2P) communication system, a Vehicle-to-Device (V2D) communication system, Vehicle-to-Grid (V2G) communication system, or a combination thereof. In some embodiments, the vehicular communication system 502 may be an Intelligent Transport System (ITS) for different vehicle-specific applications. Examples of the vehicle-specific applications may include, but are not limited to, autonomous/semi-autonomous/non-autonomous driving applications, navigation systems, route planning applications, parking guidance systems, lane change decision systems for autonomous/semi-autonomous driving vehicles, autonomous/semi-autonomous logistics (such as goods transport), and order tracking applications from warehouses to customer premises.

Each vehicle of the plurality of vehicles 504A, 504B, and 504C may correspond to a wireless node of the plurality of wireless nodes 104. Each vehicle of the plurality of vehicles 504A, 504B, and 504C may employ a positioning method to determine a current position estimate for itself. The positioning method may correspond to the positioning technology type associated with each vehicle of the plurality of vehicles 504A, 504B, and 504C. For example, a first vehicle 504A may employ a GNSS receiver that uses single frequency GNSS signals to determine the current position estimate for itself. Similarly, a second vehicle 504B may employ a hybrid GNSS receiver and an inertial sensor (such as an IMU) to determine the current position estimate for itself. A third vehicle 504C may rely on a GNSS receiver and cellular positioning methods (for example, Enhanced Cell-ID methods, LTE Positioning Protocol or Secure User Plane Location protocol).

In some embodiments, each vehicle of the plurality of vehicles 504A, 504B, and 504C may communicate with each other, via a vehicle network. The vehicle network for the plurality of vehicles 504A, 504B, and 504C may be established in accordance with one or more wireless communication standards/protocols. Examples of wireless communication standards/protocols may include, but are not limited to, Wireless Access for Vehicular Environments (WAVE), IEEE 802.11p, Dedicated Short Range Communications (DSRC) standard, Vehicle Ad-hoc Network (VANET), WiMAX (802.16), cellular standards, such as Global System for Mobile Communications (GSM), 3G, and LTE standards.

In accordance with an embodiment, each vehicle of the plurality of vehicles 504A, 504B, and 504C may be configured to share a current position estimate and the positioning technology type employed by the corresponding vehicle, with each other and the server 506, via an established vehicle network. The server 506 may be configured to receive the current position estimate and the positioning technology type employed by each vehicle of the plurality of vehicles 504A, 504B, and 504C.

The level of accuracy of the current position estimate may be based on the positioning technology type employed by individual vehicles in the geographical region. The server 506 may be configured to assign a weight value to each vehicle of the plurality of vehicles 504A, 504B, and 504C based on the received positioning technology type employed by the corresponding vehicle of the plurality of vehicles 504A, 504B, and 504C. The collaborative positioning approach described in FIGS. 2 and 3 is also applicable to the plurality of vehicles 504A, 504B, and 504C, without a deviation from the scope of the present disclosure. Thus, the details of the collaborative positioning approach are omitted from FIG. 5 of the disclosure for the sake of brevity.

Figure 6:
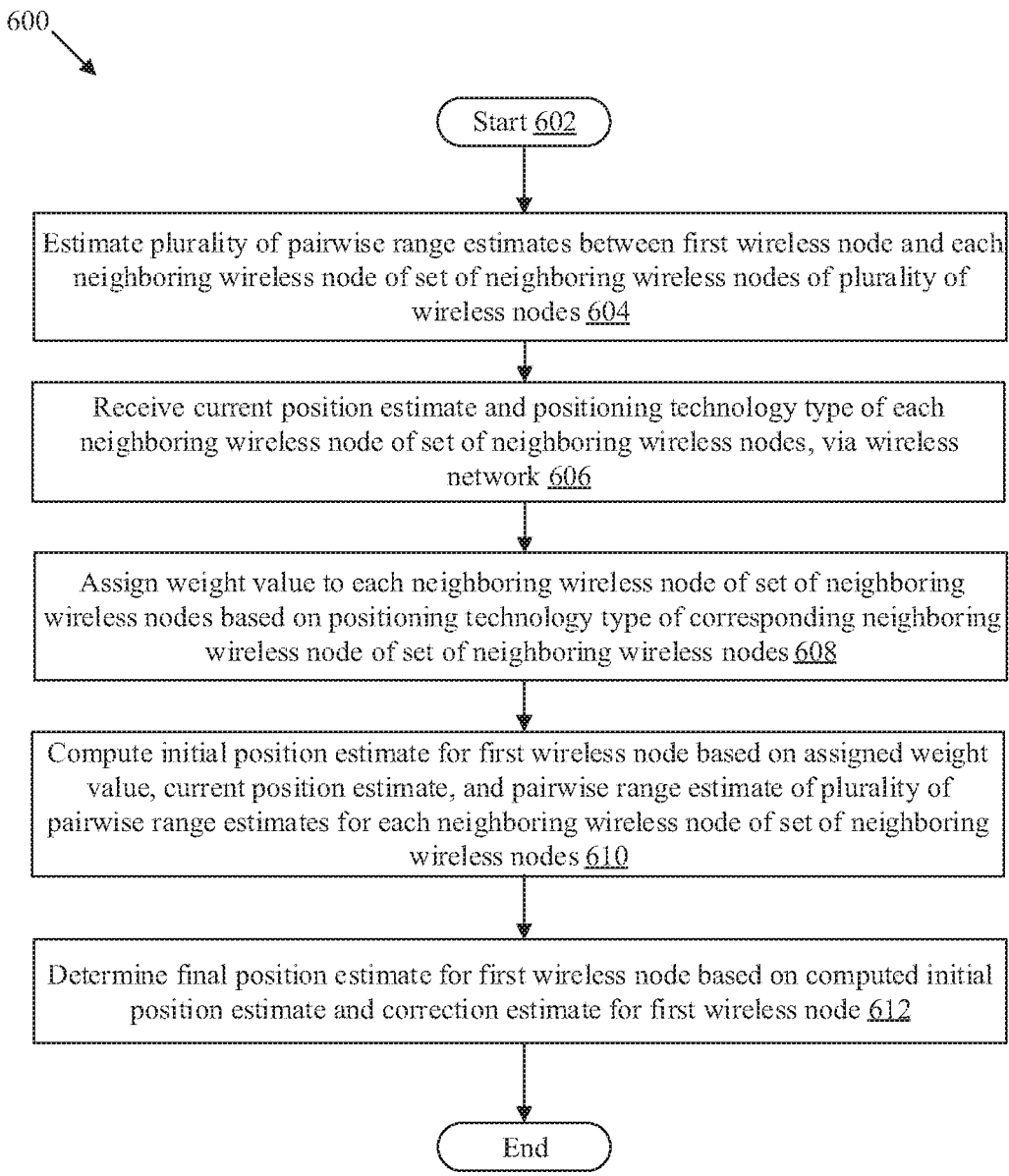
FIG. 6 illustrates a flowchart that depicts exemplary operations for collaborative positioning of wireless nodes using pairwise range measurements and positioning technology type, in accordance with an embodiment of the disclosure.

FIG. 6 illustrates a flowchart that depicts exemplary operations for collaborative positioning of wireless nodes using pairwise range measurements and positioning technology type, in accordance with an embodiment of the disclosure. FIG. 6 is explained in conjunction with elements from FIGS. 1, 2, 3, 4, and 5. With reference to FIG. 6, there is shown a flowchart 600. The operations 602 through 612 may be implemented in the system 102. The operations from 602 to 612 may be executed by the processor 204 of first wireless node 108 and other wireless nodes of the plurality of wireless nodes 104, as part of a decentralized (or peer-to-peer) collaborative position approach for the plurality of wireless nodes 104. Alternatively, the operations from 602 to 612 may be executed by the processor 304 of the server 106, as part of a centralized collaborative position approach for the plurality of wireless nodes 104. The operations of the flowchart 600 may start at 602 and proceed to 604.

At 604, a plurality of pairwise range estimates may be estimated between the first wireless node 108 and each neighboring wireless node of the set of neighboring wireless nodes 110 of the plurality of wireless nodes 104. In accordance with an embodiment, the processor 204 (or the processor 304) may be configured to estimate the plurality of pairwise range estimates between the first wireless node 108 and each neighboring wireless node of the set of neighboring wireless nodes 110.

At 606, a current position estimate and a positioning technology type of each neighboring wireless node of the set of neighboring wireless nodes 110 may be received, via the wireless network 112. In accordance with an embodiment, the processor 204 (or the processor 304) may be configured to receive the current position estimate and the positioning technology type of each neighboring wireless node of the set of neighboring wireless nodes 110, via the wireless network 112.

At 608, a weight value may be assigned to each neighboring wireless node of the set of neighboring wireless nodes 110 based on the positioning technology type of the corresponding wireless node of the set of neighboring wireless nodes 110. In accordance with an embodiment, the processor 204 (or the processor 304) may be configured to assign a weight value to each neighboring wireless node of the set of neighboring wireless nodes 110 based on the positioning technology type of the corresponding wireless node of the set of neighboring wireless nodes 110.

At 610, an initial position estimate for the first wireless node 108 may be computed based on the assigned weight value, the current position estimate, and the pairwise range estimate of the plurality of pairwise range estimate for each neighboring wireless node of the set of neighboring wireless nodes 110. In accordance with an embodiment, the processor 204 (or the processor 304) may be configured to compute the initial position estimate for the first wireless node 108 based on the assigned weight value, the current position estimate, and the pairwise range estimate of the plurality of pairwise range estimate for each neighboring wireless node of the set of neighboring wireless nodes 110.

At 612, a final position estimate may be determined for the first wireless node 108 based on the computed initial position estimate and a correction estimate for the first wireless node 108. The correction estimate may correspond to unknown coordinate corrections to the initial position estimate (such as initial coordinate approximations). In accordance with an embodiment, the processor 204 (or the processor 304) may be configured to determine the final position estimate for the first wireless node 108 based on the computed initial position estimate and the correction estimate for the first wireless node 108. Control passes to end.

Various embodiments of the disclosure may provide a non-transitory computer readable medium and/or storage medium, and/or a non-transitory machine readable medium and/or storage medium having stored thereon, a machine code and/or instructions executable by a machine, such as the server 106 or the first wireless node 108 of the plurality of wireless nodes 104 communicatively coupled to each other via the wireless network 112, and/or a computer. The instructions may cause the machine and/or computer to perform the operations that include estimation of a plurality of pairwise range estimates between the first wireless node 108 and each neighboring wireless node of the set of neighboring wireless nodes 110 of the plurality of wireless nodes 104. The operations may further include reception of the current position estimate and the positioning technology type of each neighboring wireless node of the set of neighboring wireless nodes 110, via the wireless network 112. The operations may further include assignment of a weight value to each neighboring wireless node of the set of neighboring wireless nodes 110 based on the positioning technology type of a corresponding neighboring wireless node of the set of neighboring wireless nodes 110. The operations may further include computation of an initial position estimate for the first wireless node 108. The initial position estimate may be computed based on the assigned weight value, the current position estimate, and a pairwise range estimate of the plurality of pairwise range estimates for each neighboring wireless node of the set of neighboring wireless nodes 110. The operations may further include determination of a final position estimate for the first wireless node 108 based on the computed initial position estimate and a correction estimate for the first wireless node 108.

Certain embodiments of the disclosure may be found in a system and a method for collaborative positioning of wireless nodes using pairwise range measurements and positioning technology type. Various embodiments of the disclosure may provide the system 102 that may include the plurality of wireless nodes 104 communicatively coupled to each other in the wireless network 112. Each wireless node of the plurality of wireless nodes 104 may be configured to share a current position estimate and a positioning technology type with the set of neighboring wireless nodes 110 of the plurality of wireless nodes 104. The plurality of wireless nodes 104 may include the first wireless node 108. The first wireless node 108 may include the processor 204. The processor 204 may be configured to estimate a plurality of pairwise range estimates between the first wireless node 108 and each neighboring wireless node of the set of neighboring wireless nodes 110. The processor 204 may be further configured to receive the current position estimate and the positioning technology type of each neighboring wireless node of the set of neighboring wireless nodes 110, via the wireless network 112. The processor 204 may be further configured to assign a weight value to each neighboring wireless node of the set of neighboring wireless nodes 110 based on the positioning technology type of a corresponding neighboring wireless node of the set of neighboring wireless nodes 110. The processor 204 may be further configured to compute an initial position estimate for the first wireless node 108. The initial position estimate may be calculated based on the assigned weight value, the current position estimate, and a pairwise range estimate of the plurality of pairwise range estimates for each neighboring wireless node of the set of neighboring wireless nodes 110. The processor 204 may be further configured to determine a final position estimate for the first wireless node 108 based on the computed initial position estimate and a correction estimate for the first wireless node 108.

In accordance with an embodiment, the processor 204 may be further configured to receive assistance data associated with the set of neighboring wireless nodes 110. The assistance data may include pairing information that may be indicative of a possibility of the set of neighboring wireless nodes 110 to be paired with the first wireless node 108. The processor 204 may be further configured to select the set of neighboring wireless nodes 110 to receive the current position estimate and the positioning technology type based on the received assistance data.

In accordance with an embodiment, the plurality of wireless nodes 104 may include a set of unknown location nodes and a set of known location nodes. The first wireless node 108 may be one of the sets of unknown location nodes. Each of the plurality of wireless nodes 104 may include a location sensor that outputs current positioning information of a corresponding wireless node of the plurality of wireless nodes 104. Each of the plurality of wireless nodes 104 may be configured to compute the current position estimate based on the current positioning information.

In accordance with an embodiment, the location sensor may include at least a (Global Navigation Satellite System) GNSS sensor or an inertial sensor. Also, the positioning technology type may correspond to at least a location sensor type, a type of positioning technique, or a type of signal associated with the location sensor.

In accordance with an embodiment, each pairwise range estimate of the plurality of pairwise range estimates may be estimated by application of a ranging technique between the first wireless node 108 and a neighboring wireless node of the set of neighboring wireless nodes 110. The ranging technique may be one of a Received Signal Strength (RSS)-based ranging technique, Time of Arrival (TOA)-based ranging technique, or a Round Trip Delay (RTD)-based ranging technique.

In accordance with an embodiment, the processor 204 may be further configured to estimate a plurality of ranging errors between the first wireless node 108 and each neighboring wireless node of the set of neighboring wireless nodes 110. The plurality of ranging errors may be estimated based on the plurality of Euclidean distances and the plurality of pairwise range estimates between the first wireless node 108 and each neighboring wireless node of the set of neighboring wireless nodes 110.

In accordance with an embodiment, each ranging error of the plurality of ranging errors may be estimated by application of a ranging model on a pair of a Euclidean distance of the plurality of Euclidean distances and a pairwise range estimate value of the plurality of pairwise range estimates. The pair of the Euclidean distances and the pairwise range estimate value may be between the first wireless node 108 and a neighboring wireless node of the set of neighboring wireless nodes 110.

In accordance with an embodiment, the processor 204 may be configured to compute the initial position estimate for the first wireless node 108 further based on the plurality of ranging errors between the first wireless node 108 and each neighboring wireless node of the set of neighboring wireless nodes 110.

In accordance with an embodiment, the processor 204 may be further configured to estimate the correction estimate for the first wireless node 108 by application of a Weighted Least Square (WLS) model on at least a plurality of ranging errors and a plurality of Euclidean distances between the first wireless node 108 and each neighboring wireless node of the set of neighboring wireless nodes 110. The final position estimate may be iteratively computed such that a sum of a plurality of ranging errors or a sum of a square of each of the plurality of ranging errors is a minimum.

In accordance with an embodiment, the processor 204 may be further configured to identify an activity of a neighboring wireless node of the plurality of neighboring wireless nodes as a malicious activity in the wireless network 112 when a corresponding ranging error of a plurality of ranging errors for the neighboring wireless node is greater than a threshold value. The processor 204 may be further configured to share blocking information associated with the neighboring wireless node to each of the set of neighboring wireless nodes 110. The blocking information may include details of the malicious activity of the neighboring wireless node.

Various embodiments of the disclosure may provide a system that may include the server 106. The server 106 may include the processor 304. The processor 304 may be configured to communicate with the plurality of wireless nodes 104 communicatively coupled to each other and the server 106. Each wireless node of the plurality of wireless nodes 104 may share a current position estimate and a positioning technology type with the set of neighboring wireless nodes 110 of the plurality of wireless nodes 104 and the server 106. The processor 304 may be further configured to estimate a plurality of pairwise range estimates between the first wireless node 108 of the plurality of wireless nodes 104 and each neighboring wireless node of the set of neighboring wireless nodes 110. The processor 304 may be further configured to receive the current position estimate and the positioning technology type of each neighboring wireless node of the set of neighboring wireless nodes 110, via the wireless network 112. The processor 304 may be further configured to assign a weight value to each neighboring wireless node of the set of neighboring wireless nodes 110. The weight value may be assigned based on the positioning technology type of a corresponding neighboring wireless node of the set of neighboring wireless nodes 110. The processor 304 may be further configured to compute an initial position estimate for the first wireless node 108. The initial position estimated may be computed based on the assigned weight value, the current position estimate, and a pairwise range estimate of the plurality of pairwise range estimates for each neighboring wireless node of the set of neighboring wireless nodes 110. The processor 304 may be further configured to determine a final position estimate for the first wireless node 108 based on the computed initial position estimate and a correction estimate for the first wireless node 108.

In accordance with an embodiment, each of the plurality of wireless nodes 104 may include a location sensor that outputs current positioning information of a corresponding wireless node of the plurality of wireless nodes 104. Each of the plurality of wireless nodes 104 may share the current position estimate with the server 106. The processor 304 may be further configured to compute the current position estimate of each of the plurality of wireless nodes 104 based on the current positioning information.

The present disclosure may be realized in hardware or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to support these methods. Computer program, in the present context, means any expression, in any language, code or notation, of a set of instructions intended to cause a system that has an information processing capability to perform a particular function either directly, or after either or both of the following: a) conversion to another language, code or notation; b) reproduction in a different material form.

While the present disclosure has been described with reference to certain embodiments, it will be understood by those skilled in the art that various changes may be made and equivalents may be substituted without departing from the scope of the present disclosure. In addition, many modifications may be made to adapt a particular situation or material to the teachings of the present disclosure without departing from its scope. Therefore, it is intended that the present disclosure not be limited to the particular embodiment disclosed, but that the present disclosure will include all embodiments that fall within the scope of the appended claims.

What is claimed is:

1. A system, comprising:
a plurality of wireless nodes communicatively coupled to each other, via a wireless network,
wherein each wireless node of the plurality of wireless nodes is configured to share a current position estimate and a positioning technology type with a set of neighboring wireless nodes of the plurality of wireless nodes,
wherein the plurality of wireless nodes comprises a first wireless node, and
wherein the first wireless node comprises a processor configured to:
estimate a plurality of pairwise range estimates between the first wireless node and each neighboring wireless node of the set of neighboring wireless nodes;
receive the current position estimate and the positioning technology type of each neighboring wireless node of the set of neighboring wireless nodes, via the wireless network;
assign a weight value to each neighboring wireless node of the set of neighboring wireless nodes based on the positioning technology type of a corresponding neighboring wireless node of the set of neighboring wireless nodes;
compute an initial position estimate for the first wireless node based on the assigned weight value, the current position estimate, and a pairwise range estimate of the plurality of pairwise range estimates for each neighboring wireless node of the set of neighboring wireless nodes; and
determine a final position estimate for the first wireless node based on the computed initial position estimate and a correction estimate for the first wireless node.

2. The system according to claim 1, wherein the processor is further configured to receive assistance data associated with the set of neighboring wireless nodes, wherein the assistance data comprises pairing information that is indicative of a possibility of the set of neighboring wireless nodes to be paired with the first wireless node.

3. The system according to claim 2, wherein the processor is further configured to select the set of neighboring wireless nodes to receive the current position estimate and the positioning technology type based on the received assistance data.

4. The system according to claim 1, wherein the plurality of wireless nodes comprises a set of unknown location nodes and a set of known location nodes.

5. The system according to claim 4, wherein the first wireless node is one of the of unknown location nodes.

6. The system according to claim 1, wherein each of the plurality of wireless nodes comprises a location sensor that outputs current positioning information of a corresponding wireless node of the plurality of wireless nodes, and
each of the plurality of wireless nodes is further configured to compute the current position estimate based on the current positioning information.

7. The system according to claim 6, wherein the location sensor comprises at least a (Global Navigation Satellite System) GNSS sensor or an inertial sensor.

8. The system according to claim 6, wherein the positioning technology type corresponds to at least a location sensor type, a type of positioning technique, or a type of signal associated with the location sensor.

9. The system according to claim 1, wherein
each pairwise range estimate of the plurality of pairwise range estimates is estimated by application of a ranging technique between the first wireless node and a neighboring wireless node of the set of neighboring wireless nodes, and
the ranging technique is one of a Received Signal Strength (RSS)-based ranging technique, Time of Arrival (TOA)-based ranging technique, or a Round Trip Delay (RTD)-based ranging technique.

10. The system according to claim 1, wherein
the processor is further configured to estimate a plurality of ranging errors between the first wireless node and each neighboring wireless node of the set of neighboring wireless nodes, and
the plurality of ranging errors is estimated based on a plurality of Euclidean distances and the plurality of pairwise range estimates between the first wireless node and each neighboring wireless node of the set of neighboring wireless nodes.

11. The system according to claim 10, wherein each ranging error of the plurality of ranging errors are estimated by application of a ranging model on a pair of a Euclidean distance of the plurality of Euclidean distances and a pairwise range estimate of the plurality of pairwise range estimates between the first wireless node and a neighboring wireless node of the set of neighboring wireless nodes.

12. The system according to claim 11, wherein the processor is further configured to compute the initial position estimate for the first wireless node further based on the plurality of ranging errors between the first wireless node and each neighboring wireless node of the set of neighboring wireless nodes.

13. The system according to claim 1, wherein the processor is further configured to estimate the correction estimate for the first wireless node by application of a weighted least square (LS) model on at least a plurality of ranging errors and a plurality of Euclidean distances between the first wireless node and each neighboring wireless node of the set of neighboring wireless nodes.

14. The system according to claim 1, wherein the final position estimate is iteratively computed such that a sum of a plurality of ranging errors or a sum of a square of each of the plurality of ranging errors is a minimum.

15. The system according to claim 1, wherein the processor is further configured to identify an activity of a neighboring wireless node of the set of neighboring wireless nodes as a malicious activity in the wireless network when a corresponding ranging error of a plurality of ranging errors for the neighboring wireless node is greater than a threshold value.

16. The system according to claim 15, wherein the processor is further configured to share blocking information associated with the neighboring wireless node to each of the set of neighboring wireless nodes, wherein the blocking information comprises details of the malicious activity of the neighboring wireless node.

17. A system, comprising:
a server that comprises a processor configured to:
communicate with a plurality of wireless nodes communicatively coupled to each other and the server, via a wireless network,
wherein each wireless node of the plurality of wireless nodes shares a current position estimate and a positioning technology type with a set of neighboring wireless nodes of the plurality of wireless nodes and the server;
estimate a plurality of pairwise range estimates between a first wireless node of the plurality of wireless nodes and each neighboring wireless node of the set of neighboring wireless nodes;
receive the current position estimate and the positioning technology type of each neighboring wireless node of the set of neighboring wireless nodes;
assign a weight value to each neighboring wireless node of the set of neighboring wireless nodes based on the positioning technology type of a corresponding neighboring wireless node of the set of neighboring wireless nodes;
compute an initial position estimate for the first wireless node based on the assigned weight value, the current position estimate, and a pairwise range estimate of the plurality of pairwise range estimates for each neighboring wireless node of the set of neighboring wireless nodes; and
determine a final position estimate for the first wireless node based on the computed initial position estimate and a correction estimate for the first wireless node.

18. The system according to claim 17, wherein each of the plurality of wireless nodes comprises a location sensor that outputs current positioning information of a corresponding wireless node of the plurality of wireless nodes,
each of the plurality of wireless nodes shares the current position estimate with the server, and
the processor is further configured to compute the current position estimate of each of the plurality of wireless nodes based on the current positioning information.

19. The system according to claim 17, wherein
each pairwise range estimate of the plurality of pairwise range estimates is estimated by application of a ranging technique between the first wireless node and a neighboring wireless node of the set of neighboring wireless nodes, and
the ranging technique is one of a Received Signal Strength (RSS)-based ranging technique, Time of Arrival (TOA)-based ranging technique, or a Round Trip Delay (RTD)-based ranging technique.

20. The system according to claim 17, wherein the processor is further configured to estimate a plurality of ranging errors between the first wireless node and each neighboring wireless node of the set of neighboring wireless nodes, and
the plurality of ranging errors is estimated based on a plurality of Euclidean distances and the plurality of pairwise range estimates between the first wireless node and each neighboring wireless node of the set of neighboring wireless nodes.

21. The system according to claim 20, wherein the processor is further configured to compute the initial position estimate for the first wireless node further based on the plurality of ranging errors between the first wireless node and each neighboring wireless node of the set of neighboring wireless nodes.

22. The system according to claim 17, wherein the processor is further configured to estimate the correction estimate for the first wireless node by application of a weighted least square (LS) model on at least a plurality of ranging errors and a plurality of Euclidean distances between the first wireless node and each neighboring wireless node of the set of neighboring wireless nodes.

23. A method, comprising:
in a system that comprises a plurality of wireless nodes communicatively coupled to each other via a wireless network:

estimating a plurality of pairwise range estimates between a first wireless node and each neighboring wireless node of a set of neighboring wireless nodes of the plurality of wireless nodes;

receiving a current position estimate and a positioning technology type of each neighboring wireless node of the set of neighboring wireless nodes, via the wireless network;

assigning a weight value to each neighboring wireless node of the set of neighboring wireless nodes based on the positioning technology type of a corresponding neighboring wireless node of the set of neighboring wireless nodes;

computing an initial position estimate for the first wireless node based on the assigned weight value, the current position estimate, and a pairwise range estimate of the plurality of pairwise range estimates for each neighboring wireless node of the set of neighboring wireless nodes; and determining a final position estimate for the first wireless node based on the computed initial position estimate and a correction estimate for the first wireless node.

\* \* \* \* \*